United States Patent [19]
Kawashima et al.

[11] Patent Number: 6,067,170
[45] Date of Patent: *May 23, 2000

[54] IMAGE FORMING APPARATUS FOR INDICATING COMPLETION OF SCANNING FOR BOTH SIDES OF AN ORIGINAL DOCUMENT

[75] Inventors: Yasuhiro Kawashima, Atsugi; Yasunobu Youda, Sagamihara, both of Japan

[73] Assignee: Ricoh Company, Ltd., Tokyo, Japan

[*] Notice: This patent is subject to a terminal disclaimer.

[21] Appl. No.: 09/022,884

[22] Filed: Feb. 12, 1998

Related U.S. Application Data

[63] Continuation of application No. 08/574,433, Dec. 15, 1995, Pat. No. 5,764,371.

[30] Foreign Application Priority Data

| Dec. 19, 1994 | [JP] | Japan | 6-333834 |
| Jan. 27, 1995 | [JP] | Japan | 7-30221 |
| May 10, 1995 | [JP] | Japan | 7-135730 |
| Sep. 22, 1995 | [JP] | Japan | 7-268086 |

[51] Int. Cl.[7] .................................................... H04N 1/00
[52] U.S. Cl. ........................ 358/405; 358/436; 358/439; 358/450
[58] Field of Search .................................. 358/450, 405, 358/406, 434, 439, 468, 488, 540; H04N 1/00

[56] References Cited

U.S. PATENT DOCUMENTS

| 4,908,714 | 3/1990 | Iryiama et al. | 358/405 |
| 4,991,828 | 2/1991 | Mizoguchi . | |
| 5,278,666 | 1/1994 | Satomi et al. | 358/405 |
| 5,410,419 | 4/1995 | Muramatsu et al. | 358/488 |
| 5,497,250 | 3/1996 | Kawashima | 358/488 |
| 5,764,371 | 6/1998 | Kawashima et al. | 358/405 |

*Primary Examiner*—Kim Yen Vu
*Attorney, Agent, or Firm*—Oblon, Spivak, McClelland, Maier & Neustadt, P.C.

[57] ABSTRACT

An image forming apparatus indicates completion of a scanning operation for both sides of an original document, or completion of a transmitting operation of image information data corresponding to both sides of the original document. The image forming apparatus scans both sides of the original document for obtaining the image information data. A first marker unit provides a first mark when a scanning of a front side of the original document is completed or when a transmission of image information data corresponding to the front side is completed. A second marker unit provides a second mark when a scanning of a reverse side of the original document is completed or when a transmission of image information data corresponding to the reverse side is completed.

15 Claims, 22 Drawing Sheets

IMAGE FORMING APPARATUS FOR INDICATING COMPLETION OF SCANNING FOR BOTH SIDES OF AN ORIGINAL DOCUMENT

This application is a continuation of Ser. No. 08/574,433 filed Dec. 15, 1995 U.S. Pat. No. 5,764,371.

BACKGROUND OF THE INVENTION

1. Field of the Invention

The present invention generally relates to image forming apparatuses and, more particularly, to an image forming apparatus which provides a mark on an original document, the mark representing a completion of scanning of the original document.

2. Description of the Related Art

FIG. 1 is an illustration showing a structure of a conventional facsimile apparatus having an image scanning apparatus therein. The facsimile apparatus 1 shown in FIG. 1 transmits and receives image information through a communication network. The facsimile apparatus 1 has an image scanning apparatus 2 and a recording apparatus 3. The image scanning apparatus scans an original to obtain the image information. The recording apparatus 3 outputs the image information scanned by the image scanning apparatus 2 or the image information received from a remote facsimile apparatus. The original document to be scanned is placed on an original document table 4. The presence of the original document and the size of the original document are detected by an original document detecting unit 5. A separating unit 6 separates each original document so as to feed a plurality of original documents one after another. Each original document is further fed by a pair of first conveying rollers 7. A pair of second conveying rollers 8 feeds each original document while rotating in synchronization with the rotation of the first conveying rollers 7. A scanner 9 is located between the pair of first rollers 7 and the pair of second rollers 8 so as to scan each original document fed by the rollers 7 and 8. The scanner 9 sends image information to an image processing unit (not shown in the figure) provided in the facsimile apparatus 1. A marker unit 10 marks an indication (hereinafter referred to as a scan completion mark) representing completion of the scanning operation for the original document as shown in FIG. 2. A circle is marked on the original document when the scanning operation is completed. The scanned original document is then ejected to an original document tray 11. A recording sheet tray 12 receives recording sheets ejected by the recording apparatus 3.

In the above-mentioned conventional facsimile apparatus 1, only one side of the original document is scanned, and the scan completion mark is marked only on the scanned side of the original document. FIG. 3 shows a part of a structure of another image forming apparatus in which the original document is turned over by a turn over unit 13 so as to scan both sides of the original document. However, in the image forming apparatus shown in FIG. 3, the scan completion mark can be provided on only one side of the original document. Additionally, the scan completion mark provided by the above-mentioned image forming apparatus cannot indicate whether the scanning operation for both sides or only one side of the original document has been completed.

It should be noted that the scan completion mark may be provided after completion of a transmitting operation of the image information obtained by the scanning performed by the scanner 9, or after temporarily storing the image information in a memory. The scan completion mark provided after completion of the transmitting operation of the image information may be hereinafter referred to as a transmission completion mark.

SUMMARY OF THE INVENTION

It is a general object of the present invention to provide an improved and useful image forming apparatus in which the above-mentioned problems are eliminated.

A more specific object of the present invention is to provide an image forming apparatus which can indicate completion of a scanning operation for both sides of an original document, or completion of a transmitting operation of image information data corresponding to both sides of the original document.

Another object of the present invention is to provide an image forming apparatus which can indicate whether the scanning operation for both sides of or only one side of the original document has been completed.

Another object of the present invention is to provide an image forming apparatus which transmits image information data to a remote apparatus through a communication line and indicates whether the transmitting operation of the image information data corresponding to both sides or only one side of the original document has been completed.

In order to achieve the above-mentioned objects, there is provided an image forming apparatus scanning both sides of an original document for obtaining image information data, comprising:

a scanner scanning the original document;

a first marker unit providing a first mark after a scanning of a front side of the original document is completed; and a second marker unit providing a second mark after a scanning of a reverse side of the original document is completed.

Thus, a user can visually recognize completion of scanning of the front side and the reverse side of the original document by the first mark and the second mark provided on each side of the original document. The first marker unit may provide the first mark on the front side of the original document and the second marker unit may provide the second mark on the reverse side of the original document. Thus, completion of scanning of the front side and completion of scanning of the reverse side can be recognized separately.

In one embodiment, the first marker unit provides the first mark at a position different from a position of the second mark on the opposite side of the original document. Thus, difficulty in differentiating the first mark and the second mark due to blurring of ink can be eliminated. Additionally, the first mark may have a color different from a color of the second mark so that the first mark can be readily distinguished from the second mark. In an alternative case, the first mark may have a shape different from a shape of the second mark.

Additionally, the first marker unit and the second marker unit may be controlled so that only a selected one of the first mark and the second mark is provided on one side of the original document. The selected one of the first mark and the second mark represents completion of scanning of both sides of the original document. A side of the original document, on which side the selected one of the first mark and the second mark is provided, may be designated so that a user can select a side to be marked if there is a side on which marking is not desired. Additionally, one of the first mark and the second mark may be provided a plurality of times on the same side of the original document so that completion of scanning of the front side of the original document is visually distinguished from completion of scanning of the reverse side of the original document by a number of the one of the first mark and the second mark.

According to another aspect of the present invention, the image information data is transmitted to a remote apparatus through a communication line after a scanning of the original document has been completed. The first mark and the second mark are provided on the original document after a transmitting operation of the image information data is performed so that the first mark and the second mark represent completion of the transmitting operation.

Additionally, in one embodiment, the first marker provides the first mark on one side of the original document and the second marker unit provides the second mark on the one side of the original document. That is, the first mark and the second mark are provided on the same side of the original document. Thus, completion of scanning of both sides of the original document can be recognized by checking one side of the original document. The first mark may have a color different from a color of the second mark. In an alternative case, the first mark may have a shape different from a shape of the second mark. Additionally, the first marker unit and the second marker unit may be controlled so that only one of the first mark and the second mark is provided on one side of the original document so that the only one of the first mark and the second mark represents completion of scanning of both sides of the original document. Additionally, one of the first mark and the second mark may be provided a plurality of times on the same side of the original document so that completion of scanning of the front side of the original document is visually distinguished from completion of scanning of the reverse side of the original document by a number of the one of the first mark and the second mark. The selected one of the first mark and the second mark may be a sign or a character.

According to another aspect of the present invention, the image information data is transmitted to a remote apparatus through a communication line after a scanning of the original document has been completed. The first mark and the second mark are provided on the original document after a transmitting operation of the image information data is performed so that the first mark and the second mark represent completion of the transmitting operation.

Additionally, there is provided an image forming apparatus scanning both sides of an original document for obtaining image information data, comprising:

a scanner scanning the original document;
a marker unit providing a mark after a scanning of at least one side of the original document is completed; and
a moving mechanism moving said marker unit between a first position and a second position.

Thus, the marks can be provided at a plurality of positions by moving the marker unit to the first position or the second position. Completion of scanning of one side of the original document may be represented by the mark provided when the marker unit is at one of the first position and the second position, and completion of scanning of the other side of the original document is represented by the mark provided when the marker unit is at the other one of the first position and the second position. Additionally, the marker unit may be moved to one of the first position and the second position when the mark is provided so that completion of scanning of one side of the original document is distinguished from completion of scanning of both sides of the original document by a number of marks provided on the original document.

According to another aspect of the present invention, the image information data is transmitted to a remote apparatus through a communication line after a scanning of the original document has been completed. A mark is provided on the original document after a transmitting operation of the image information data is performed so that said mark represents completion of the transmitting operation.

Additionally, there is provided an image forming apparatus scanning both sides of an original document for obtaining image information data, comprising:

a scanner scanning the original document; and
a marker unit providing a mark after a scanning of at least one side of the original document is completed, the marker unit providing a plurality of marks in accordance with a condition of completion of scanning of the original document.

Because the marker unit provides a plurality of marks on the original document, the mark provided on the original document can be changed according to completion of scanning of the front side and reverse side. In one embodiment, the marks include a small circle and a large circle of greater diameter than the small circle. The small circle is provided when scanning of one side of the original document is completed. The large circle is provided when scanning of the other side of the original document is completed. The small circle and the large circle mat be provided at: the same time when scanning of both sides of the original document is completed. The marker unit may comprise a rod-like magnet, a cylindrical magnet and an electromagnet body. The rod like magnet has a first stamp which stamps the small circle. The cylindrical magnet has a second stamp which stamps said large circle. The rod-like magnet is accommodated in the cylindrical magnet. The electromagnet body comprises a first electromagnet and a second electromagnet mounted on the first electromagnet, an assembly of the rod like magnet and the cylindrical magnet is accommodated in the electromagnet member. The first stamp protrudes from the electromagnet body when one of the first electromagnet and the second electromagnet is activated. The second stamp protrudes from the electromagnetic body when the other one of the first electromagnet and the second electromagnet is activated.

According to one aspect of the present invention, the image information data is transmitted to a remote apparatus through a communication line after a scanning of an original document has been completed. The mark is provided on the original document after a transmitting operation of the image information data is performed so that the mark represents completion of the transmitting operation.

Other objects, features and advantages of the present invention will become more apparent from the following detailed description when read in conjunction with the accompanying drawings.

DETAILED DESCRIPTION OF THE PREFERRED EMBODIMENTS

Figure 1:
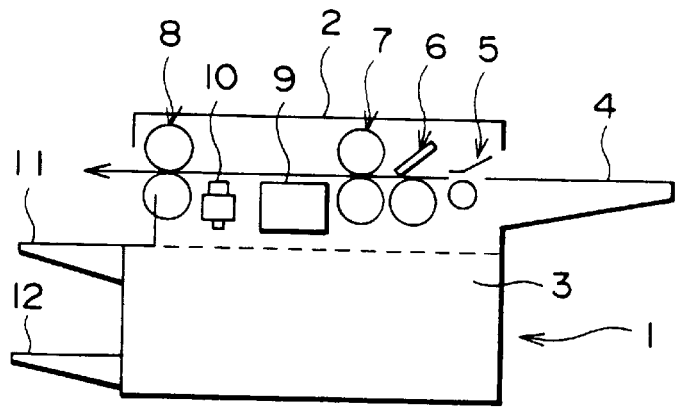
FIG. 1 is an illustration showing a structure of a conventional facsimile apparatus having an image scanning apparatus therein.
Figure 2:
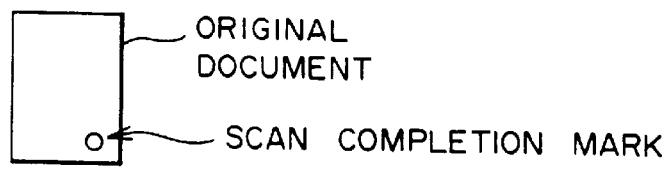
FIG. 2 is an illustration of an original document on which a scan completion mark is provided.
Figure 3:
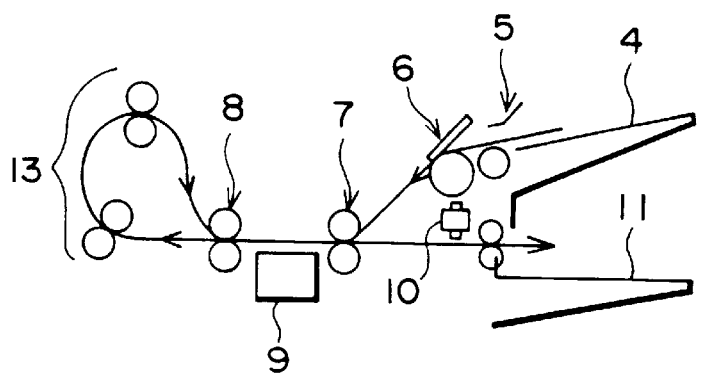
FIG. 3 is an illustration showing a part of a structure of another conventional image forming apparatus.
Figure 4:
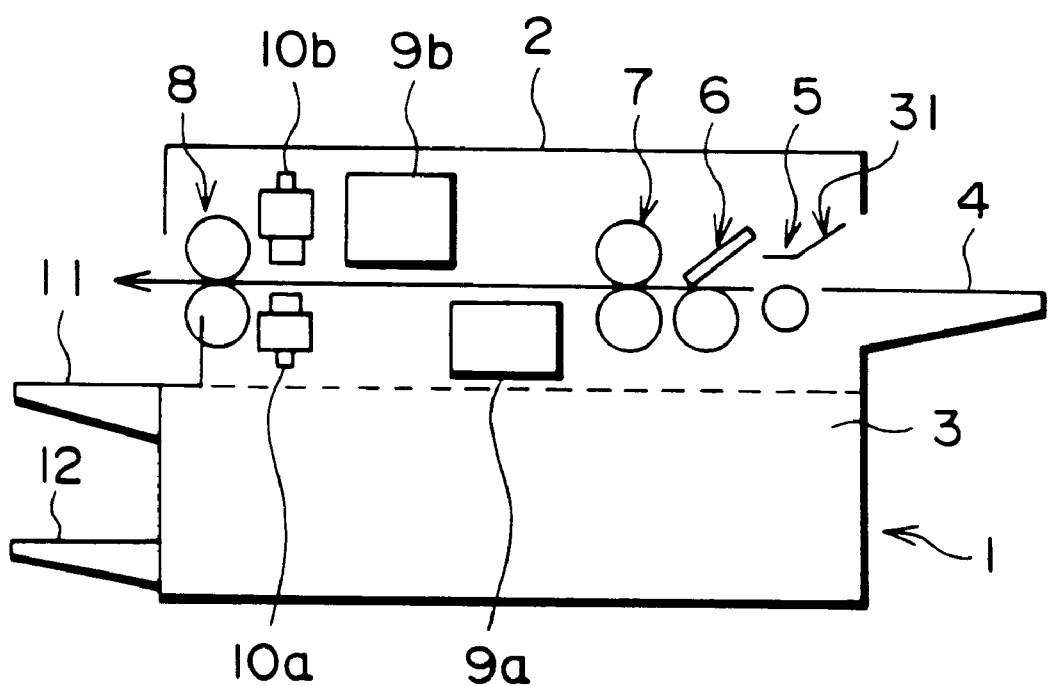
FIG. 4 is an illustration of a structure of a facsimile apparatus having an image forming apparatus according to a first embodiment of the present invention.

FIG. 4 is an illustration of a structure of a facsimile apparatus having an image forming apparatus according to a first embodiment of the present invention. In FIG. 4, parts that are the same as the parts shown in FIG. 1 are given the same reference numerals, and descriptions thereof will be omitted.

In FIG. 4, a first scanner 9a scans the front side of an original document, and a second scanner 9b scans the reverse side of the original document. A first marker unit 10a marks a scan completion mark on the front side of the original document when a scanning operation for the front side of the original document is completed. A second marker unit 10b marks a scan completion mark on the reverse side of the original document when a scanning operation of the reverse side of the original document is completed.

Figure 5:
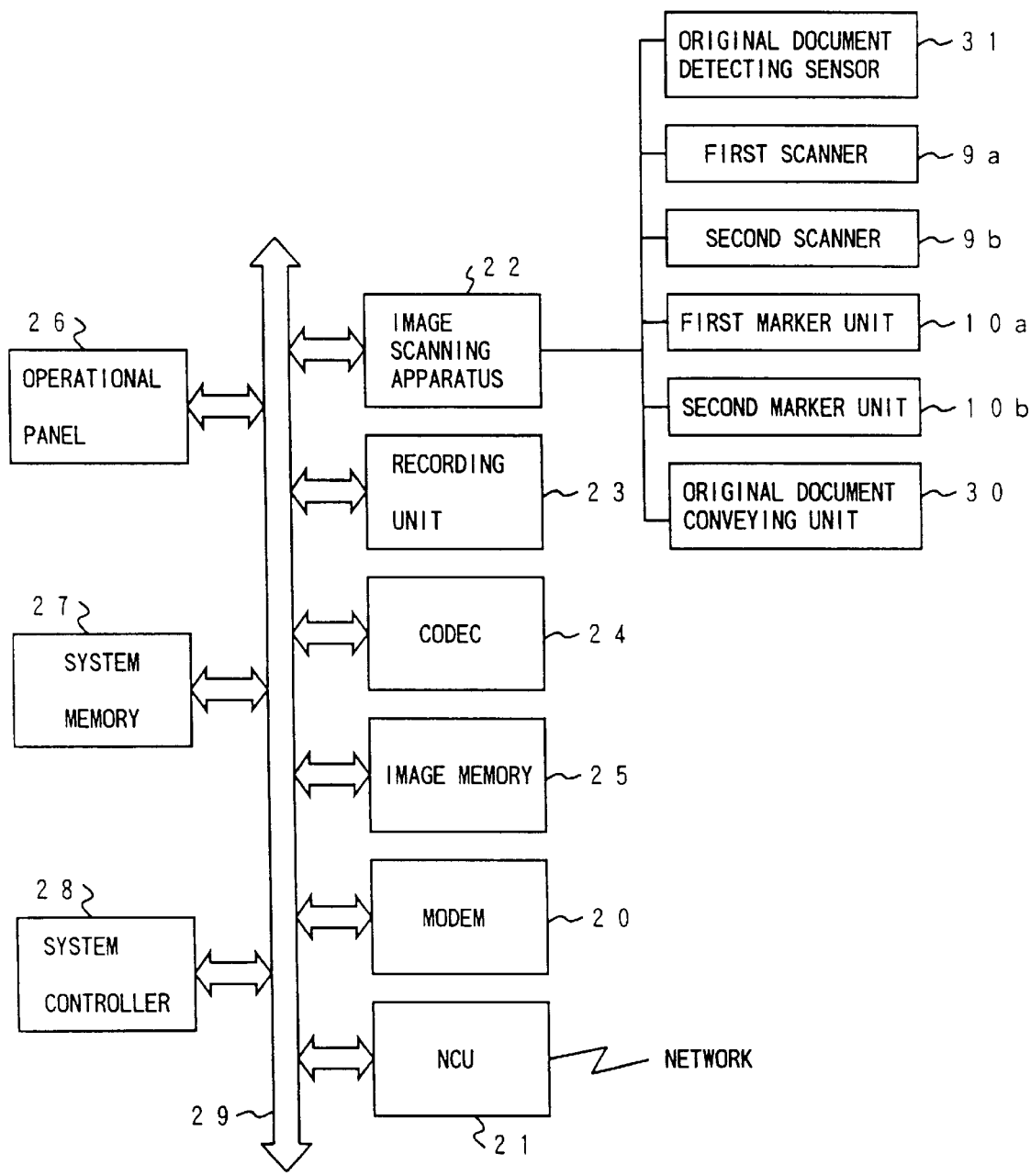
FIG. 5 is a block diagram of the facsimile apparatus shown in FIG. 4.

FIG. 5 is a block diagram of the facsimile apparatus shown in FIG. 4. In FIG. 5, a modem 20 transmits and receives image information data and various communication protocol signals so as to communicate with a remote facsimile apparatus. A network controlling unit (NCU) 21 controls a connection of a network when the local facsimile apparatus call a remote facsimile apparatus or when the local facsimile apparatus is called. An image scanning apparatus 22 scans the original document. A recording unit 23 outputs the image information data scanned by the image scanning apparatus 22 or the image information data received from a remote facsimile apparatus. An encoder/decoder unit (CODEC) 24 compresses the image information data obtained by scanning, and restores the image information data received from a remote facsimile apparatus. An image memory 25 temporarily stores the image information data to be transmitted or stores the image information data received from a remote facsimile apparatus, if necessary. An operational panel 26 is operated by an operator for inputting various commands and instructions. Operational conditions of the facsimile apparatus are displayed on the operational panel 26. A system memory 27 stores information to be registered in the facsimile apparatus and information to be temporarily stored for performing a communication.

The image scanning apparatus 22 comprises an original document detecting sensor 31, the first scanner 9a, the second scanner 9b, the first marker unit 10a, the second marker unit 10b and an original document conveying unit 30. The original document detecting sensor 31 detects presence of the original document placed on the original document table 4. The original document conveying unit 30 drives the rollers to convey the original document. As mentioned above, the first scanner 9a scans the front side of the original document, and the second scanner 9b scans the reverse side of the original document. The first marker unit 10a marks the scan completion mark on the front side of the original document when a scanning operation for the front side of the original document is completed. The second marker unit 10b marks the scan completion mark on the reverse side of the original document when a scanning operation of the reverse side of the original document is completed.

The above-mentioned parts shown in FIG. 5 are connected through a system bus 29, and are controlled by a system controller 28.

Figure 6:
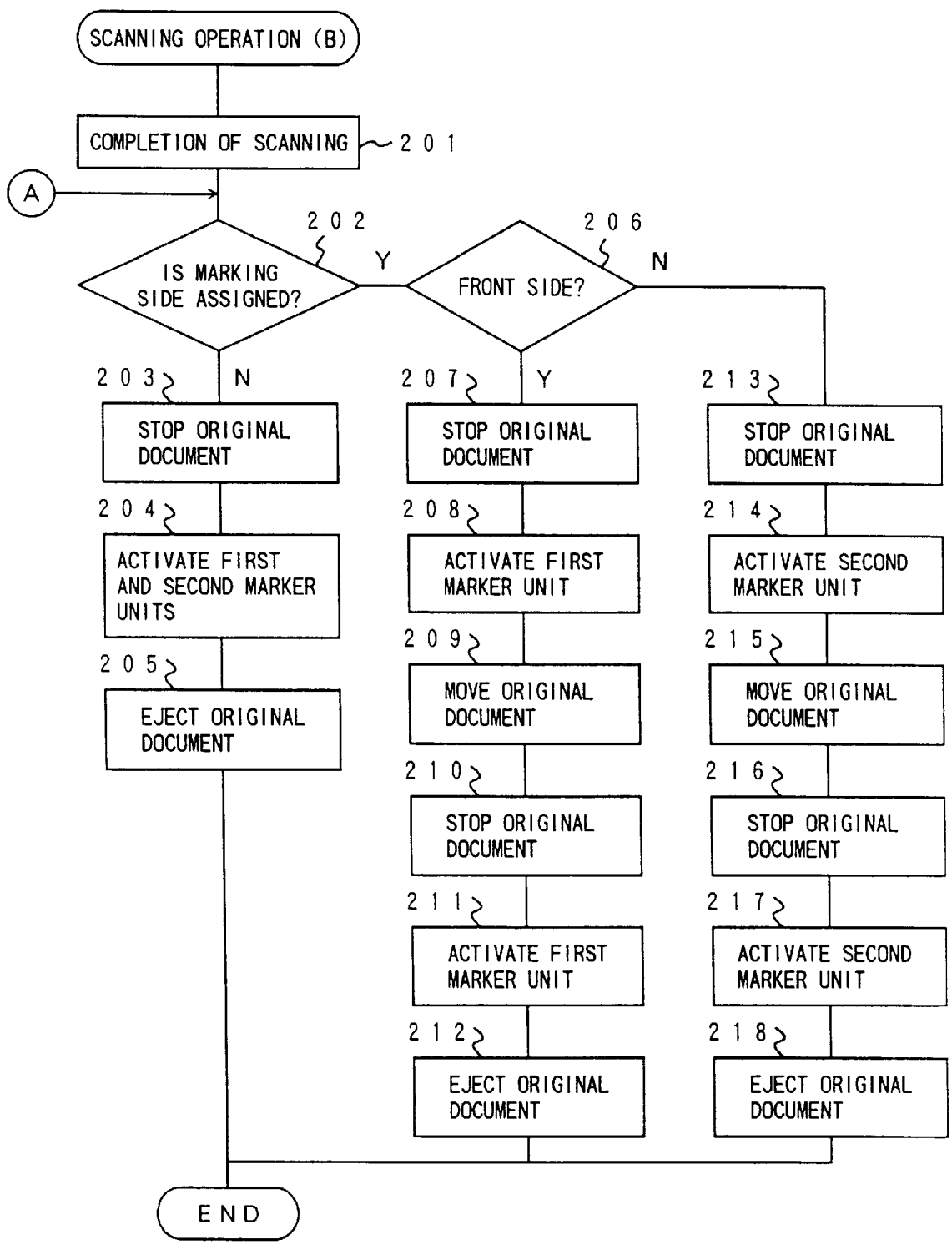
FIG. 6 is a flowchart of a scanning operation performed in the facsimile apparatus shown in FIG. 4.

FIG. 6 is a flowchart of a scanning operation (B) performed in the facsimile apparatus shown in FIG. 4. When the scanning operation (B) is started, both sides of the original document are scanned by the first scanner 9a and the second scanner 9b, respectively. After the scanning for both sides of the original document is completed in step 201, the routine proceeds to step 202 so as to determine whether or not a side to be marked is designated by the operator. The side to be marked is hereinafter referred to as a marking side. The marking side is designated by an input by the operator through the operational panel 26. If it is determined that the marking side is not designated, the routine proceeds to step 203 so as to stop the original document at a predetermined position. Thereafter, in step 204, the first marker unit 10a marks the scan completion mark on the front side of the original document, and the second marker unit 10b marks the scan completion mark on the reverse side of the original document. Then, the original document is ejected, in step 205, by the second pair of rollers 8, and then the routine is ended.

On the other hand, if it is determined, in step 202, that the marking side is designated, it is determined, in step 206, whether or not the front side is designated for the marking side. If it is determined, in step 206, that the front side is designated for the marking side, the original document is stopped at a predetermined position in step 207. The first marker unit 10a marks, in step 208, the scan completion mark on the front side of the original document. The scan completion mark marked in step 208 represents the completion of the scanning of the front side. Then, the movement of the original document is started in step 209, and stopped again in step 210. Then the first marker unit 10a marks another scan completion mark, in step 211, on the front side of the original document. The scan completion mark marked in step 211 represents the completion of the scanning of the reverse side. Thereafter, the original document is ejected by the second pair of rollers 8, and then the routine is ended.

If it is determined, in step 206, that the front side is not designated for the marking side, that is, if the reverse side is designated for the marking side, the original document is stopped at a predetermined position in step 213. The second marker unit 10b marks, in step 214, the scan completion mark on the reverse side of the original document. The scan completion mark marked in step 214 represents the completion of the scanning of the front side. Then, the movement of the original document is started in step 215, and stopped again in step 216. Then the second marker unit 10b marks another scan completion mark, in step 217, on the reverse side of the original document. The scan completion mark marked in step 217 represents the completion of the scanning of the reverse side. Thereafter, the original document is ejected by the second pair of rollers 8, and then the routine is ended.

As mentioned above, by performing the scan operation (B), the end completion marks for both sides of the original document may be marked only on one side of the original document. The marking side can be designated by the operator. Thus the scan completion mark is not marked on the side for which the marking is not preferable.

Figure 7:
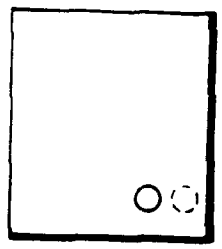
FIG. 7 is an illustration of an original document showing an example of the scan completion marks provided by a first marker unit and a second marker unit.

FIG. 7 is an illustration of the original document showing an example of the scan completion marks provided by the first marker unit 10a and the second marker unit 10b. The scan completion marks shown in FIG. 7 correspond to the scan completion marks marked when the marking side is not designated. The scan completion mark on the front side is marked in a position different from the position of the scan completion mark on the reverse side. The solid-line circle corresponds to the scan completion mark on the front side and the dotted-line circle corresponds to the scan completion mark on the reverse side.

Figure 8:
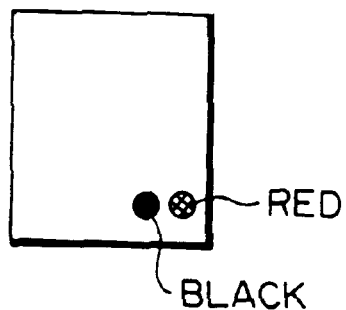
FIG. 8 is an illustration of the original document showing another example of the scan completion marks.

FIG. 8 is an illustration of the original document showing another example of the scan completion marks. The color of the scan completion mark provided by the first marker unit 10a is different from the color of the scan completion mark provided by the second marker unit 10b. In the case of FIG. 8, the first marker unit 10a provides the scan completion mark in black, and the second marker unit 10b provides the scan completion mark in red.

Figure 9:
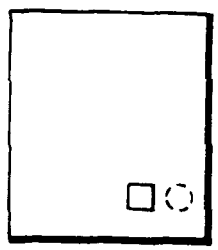
FIG. 9 is an illustration of the original document showing another example of the scan completion marks.

FIG. 9 is an illustration of the original document showing another example of the scan completion marks. The shape of the scan completion mark provided by the first marker unit 10a is different from the shape of the scan completion mark provided by the second marker unit 10b. In the case of FIG. 9, the first marker unit 10a provides the scan completion mark having a square shape, and the second marker unit 10b provides the scan completion mark having a circle shape.

Figure 10:
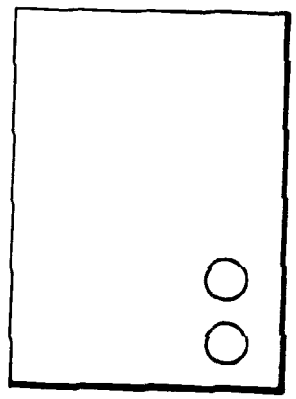
FIG. 10 is an illustration of the original document showing an example of the scan completion marks provided when a marking side is designated.

FIG. 10 is an illustration of the original document showing an example of the scan completion marks provided when the marking side is designated. The scan completion marks representing the completion of the scanning of the front side and the reverse side are provided on one side of the original document. The scan completion marks are provided in different positions along the moving direction of the original document.

Figure 11:
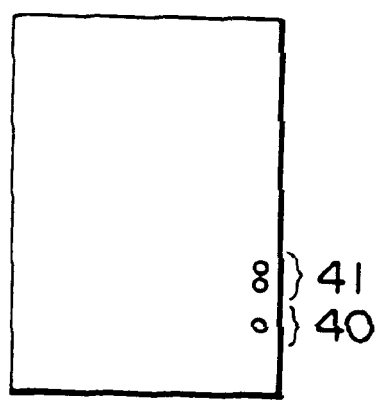
FIG. 11 is an illustration of the original document showing another example of the scan completion marks provided when a marking side is designated.

FIG. 11 is an illustration of the original document showing another example of the scan completion marks provided when the marking side is designated. The scan completion marks representing the completion of the scanning of the front side and the reverse side are provided on one side of the original document. The scan completion marks are provided in different positions along the moving direction of the original document. In this case, the second marker unit 10b provide two scan completion marks 41. That is, the scan completion mark 40 is provided by the first marker unit 10a, and the scan completion marks 41 are provided by the second marker unit 10b. In order to provide the two scan completion marks by the second marker unit 10b, additional steps must be performed between step 211 and step 212 or between step 217 and step 218. The additional steps include a step for stopping the original document and a step for providing the scan completion mark by the first marker unit 10a or the second marker unit 10b, correspondingly. That is, the steps 209 to 211 are repeated, or the steps 215 to 217 are repeated.

Figure 12:
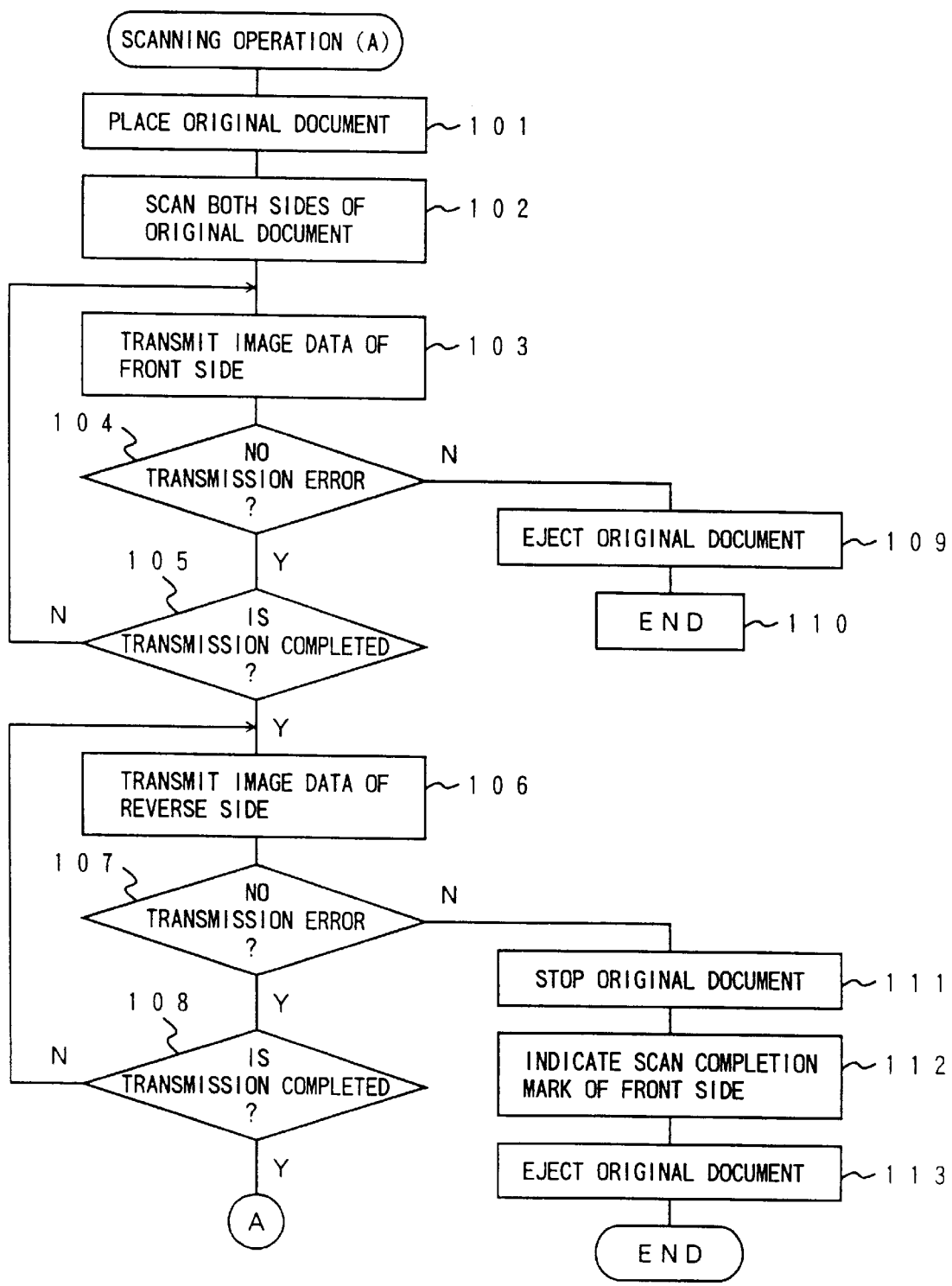
FIG. 12 is a flowchart of a scanning operation performed in the facsimile apparatus shown in FIG. 4.

FIG. 12 is a flowchart of a scanning operation (A) performed in the facsimile apparatus shown in FIG. 4. In the scanning operation (A), the image information data obtained by scanning the original document is immediately transmitted to a remote facsimile apparatus. Accordingly, marks provided by the first marker unit 10a and the second marker unit 10b correspond to the transmission completion marks which represent completion of the transmitting operation of the image information data.

When the scanning operation (A) is started, an original document is placed, in step 101, on the original document table 4. At this time, the operation for scanning both sides of the original document is designated through the operational panel 26. In step 102, both sides of the original document are scanned by the first scanner 9a and the second scanner 9b, respectively. The image information data from the first scanner 9a is encoded and compressed by the CODEC 24, and then the compressed image information data is transmitted, in step 103, to a remote facsimile apparatus. That is, the image information data corresponding to the front side of the original document is transmitted to the remote facsimile apparatus. It is determined, in step 104, whether or not no error has occurred in the transmitting operation. If it is determined that an error has occurred in the transmitting operation, the routine proceeds to step 109 so as to eject the original document, and the routine is ended in step 110. If it is determined, in step 104, that no error has occurred, the routine proceeds to step 105. In step 105, it is determined whether or not the transmitting operation for the front side of the original document has been completed. If it is determined that the transmitting operation has not been completed, the routine returns to step 103. If it is determined that the transmitting operation for the front side of the original document has been completed, the routine proceeds to step 106. In step 106, the image information data from the second scanner 9b is encoded and compressed by the CODEC 24, and then the compressed image information data is transmitted to the remote facsimile apparatus. That is, the image information data corresponding to the reverse side of the original document is transmitted to the remote facsimile apparatus. It is determined, in step 107, whether or not no error has occurred in the transmitting operation. IF it is determined that an error has occurred in the transmitting operation, the routine proceeds to step 111 so as to stop the movement of the original document. Then, the original document is marked, in step 112, by the first marker unit 9a. The original document is then ejected in step 113, and the routine is ended. If it is determined, in step 106, that no error has occurred, the routine proceeds to step 108. In step 108, it is determined whether or not the transmitting operation has been completed. If it is determined that the transmitting operation has not been completed, the routine returns to step 106. If it is determined that the transmitting operation has been completed, the routine proceeds to step 202 of the scanning operation (B) shown in FIG. 6. In the above-mentioned operation, the mark provided by the first marker unit 10a in step 112 corresponds to the transmission completion mark representing completion of the scanning of the front side.

It should be noted that in the above-mentioned scanning operation, the image information data is transmitted immediately after the scanning of the original document is completed. However the transmitting operation may be performed after the image information data is temporarily stored in the image memory 25. In such a case, the first marker unit 10a marks the original document after the completion of the scanning of the original document. Thus, the mark provided by the first marker unit 10a corresponds to the scan completion mark.

Figure 13:
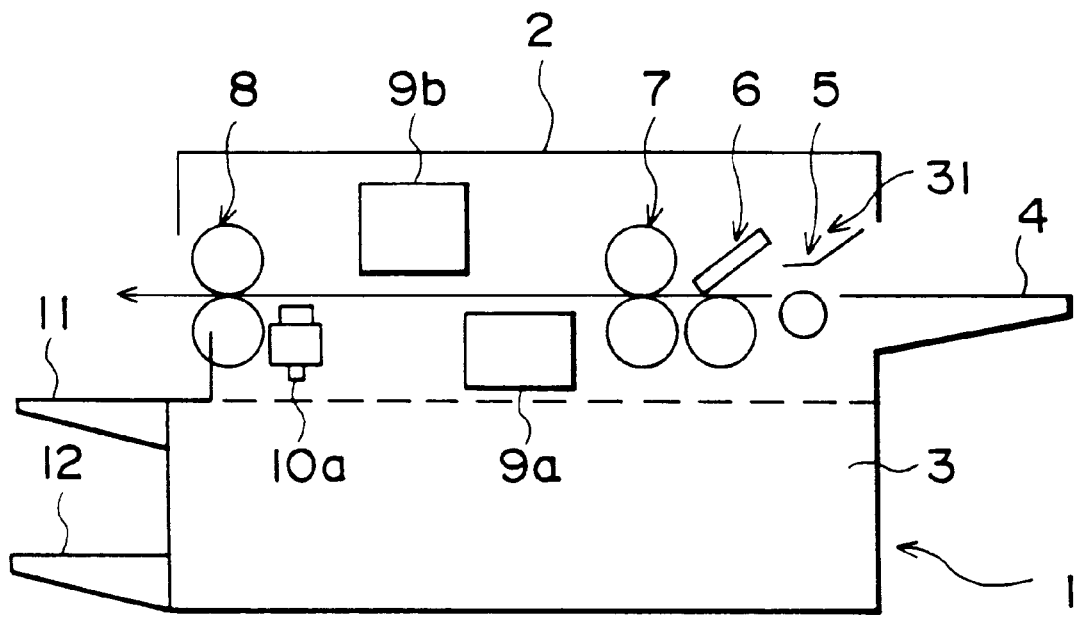
FIG. 13 is an illustration of a structure of a facsimile apparatus having an image forming apparatus according to a second embodiment of the present invention.

A description will now be given of a second embodiment of the present invention. FIG. 13 is an illustration of a structure of a facsimile apparatus having an image forming apparatus according to the second embodiment of the present invention. In FIG. 13, parts that are the same as the parts shown in FIG. 1 are given the same reference numerals, and descriptions thereof will be omitted.

Figure 14:
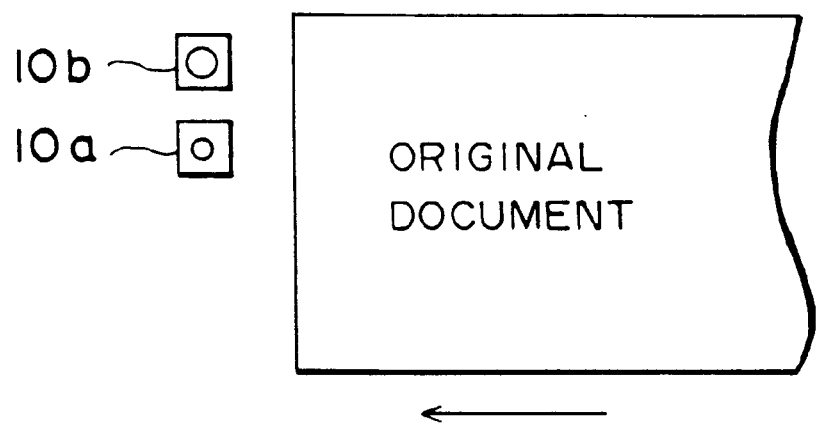
FIG. 14 is an illustration for explaining positions of a first marker unit and a second marker unit shown in FIG. 13.

In FIG. 13, the first scanner 9a scans the front side of an original document, and the second scanner 9b scans the reverse side of the original document. The first marker unit 10a marks the scan completion mark on one side of the original document when a scanning operation for the front side of the original document is completed. The second marker unit 10b marks the scan completion mark on the one side of the original document when a scanning operation of the reverse side of the original document is completed. As shown in FIG. 14, the first marker unit 10a and the second marker unit 10b are provided on the same side of the path of the original document. That is, the first marker unit 10a and the second marker unit 10b provide the scan completion mark on the same side of the original document. It should be noted that the facsimile apparatus shown in FIG. 13 has the same structure as that shown in FIG. 5.

Figure 15:
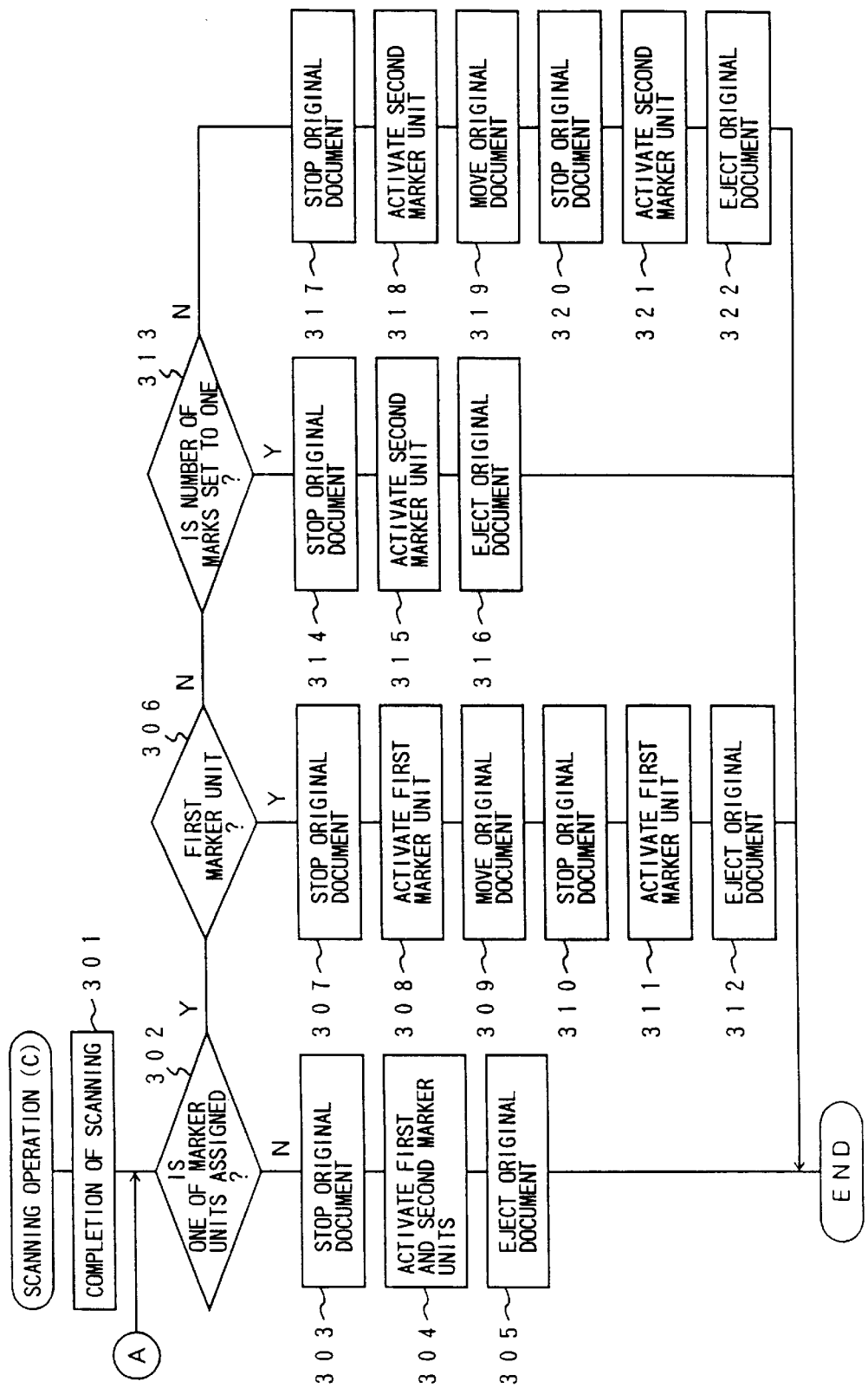
FIG. 15 is a flowchart of a scanning operation performed in the facsimile apparatus shown in FIG. 13.

In the second embodiment, a scanning operation (C) shown in FIG. 15 is performed. FIG. 15 is a flow chart of the scanning operation (C) performed in the facsimile apparatus having the image forming apparatus according to the second embodiment of the present invention.

When the scanning operation (C) is started, both sides of the original document are scanned by the first scanner 9a and the second scanner 9b, respectively. After the scanning for both sides of the original document is completed in step 301, the routine proceeds to step 302 so as to determine whether or not one of the first marker unit 10a and the second marker unit 10b is designated by the operator. The marker unit is designated by an input by the operator through the operational panel 26. If it is determined that a marker unit is not designated, the routine proceeds to step 303 so as to stop the original document at a predetermined position. Thereafter, in step 304, the first marker unit 10a marks the scan completion mark on the front side of the original document, and the second marker unit 10b marks the scan completion mark on the same side of the original document. Then, the original document is ejected, in step 305, by the second pair of rollers 8, and then the routine is ended.

On the other hand, if it is determined, in step 302, that one of the marker units is designated, it is determined, in step 306, whether or not the first marker unit 10a is designated. If it is determined, in step 306, that the first marker unit 10a is designated, the original document is stopped at a predetermined position in step 307. The first marker unit 10a marks, in step 308, the scan completion mark on one side of the original document. The scan completion mark marked in step 308 represents the completion of the scanning of the front side. Then, the movement of the original document is started in step 309, and stopped again in step 310. Then the first marker unit 10a marks another scan completion mark, in step 311, on the same side of the original document. The scan completion mark marked in step 311 represents the completion of the scanning of the reverse side. Thereafter, the original document is ejected by the second pair of rollers 8, and then the routine is ended.

If it is determined, in step 306, that the first marker unit 10a is not designated, that is, if the second marker unit 10b is designated, the routine proceeds to step 313. In step 313, it is determined whether or not the number of marks is set to one. The number of marks is set by an input by the operator through the operational panel 26. If it is determined that the number of marks is set to one, the routine proceeds to step 314 so as to stop the original document at a predetermined position. Thereafter, in step 315, the second marker unit 10b marks the scan completion mark on one side of the original document. The scan completion mark provided in step 315 represents completion of the scanning operation for both sides of the original document. Then, the original document is ejected, in step 316, by the second pair of rollers 8, and then the routine is ended.

On the other hand, if it is determined, in step 313, that the number of marks is not set to one, the routine proceeds to step 317. In step 317, the original document is stopped at a predetermined position. The second marker unit 10b marks, in step 318, the scan completion mark on one side of the original document. The scan completion mark marked in step 318 represents the completion of the scanning of the front side. Then, the movement of the original document is started in step 319, and stopped again in step 320. Then the second marker unit 10b marks another scan completion mark, in step 321, on the same side of the original document. The scan completion mark marked in step 321 represents the completion of the scanning of the reverse side. Thereafter, the original document is ejected, in step 322, by the second pair of rollers 8, and then the routine is ended.

Figure 16:
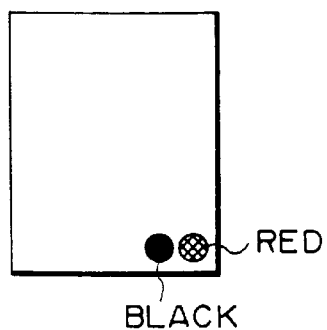
FIG. 16 is an illustration of an original document showing one example of scan completion marks provided by the scanning operation shown in FIG. 15 when none of the marker units is designated.

FIG. 16 is an illustration of the original document showing one example of the scan completion marks provided by the scanning operation (C) when none of the marker units is designated. The color of the scan completion mark provided by the first marker unit 10a is different from the color of the scan completion mark provided by the second marker unit 10b. In the case of FIG. 16, the first marker unit 10a provides the scan completion mark in black, and the second marker unit 10b provides the scan completion mark in red. The scan completion marks are provided on the same side of the original document.

Figure 17:
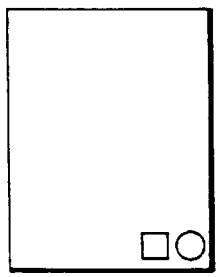
FIG. 17 is an illustration of the original document showing another example of the scan completion marks provided by the scanning operation shown in FIG. 15 when none of the marker units is designated.

FIG. 17 is an illustration of the original document showing another example of the scan completion marks provided by the scanning operation (C) when none of the marker units is designated. The shape of the scan completion mark provided by the first marker unit 10a is different from the shape of the scan completion mark provided by the second marker unit 10b. In the case of FIG. 17, the first marker unit 10a provides the scan completion mark having a square shape, and the second marker unit 10b provides the scan completion mark having a circle shape. The scan completion marks are provided on the same side of the original document. The scan completion marks provided by the first marker unit 10a and the second marker unit 10b may be patterns, signs or characters so that the scan completion marks can be distinguished from each other.

Figures 18A, 18B:
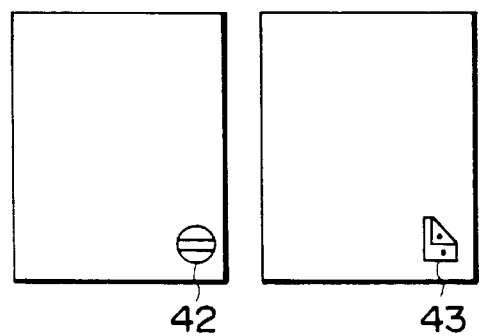
FIGS. 18A and 18B are illustrations of the original document showing the scan completion marks when a number of the marks is set to one in the scanning operation shown in FIG. 15.

It should be noted that the scan completion marks similar to that shown in FIGS. 10 and 11 are provided when one of the first marker unit 10a and second marker unit 10b is designated in step 302. Additionally, when the number of the marks is set to one in step 313, the scan completion mark 42 or 43 shown in FIGS. 18A or 18B may be provided by the second marker unit 10b in step 315. The scan completion marks 42 and 43 visually indicate completion of the scanning of both sides of the original document.

In the facsimile apparatus shown in FIG. 13 having the image forming apparatus according to the second embodiment of the present invention, the scanning operation (A) shown in FIG. 12 may also be performed similarly to the above-mentioned first embodiment. In such a case, if it is determined, in step 108, that the transmitting operation is completed, the routine proceeds to step 302 of the scanning operation (C) shown in FIG. 15. In this case, the mark provided by the first marker unit 10a in step 112 corresponds to the transmission completion mark representing the completion of the scanning of the front side.

Figure 19:
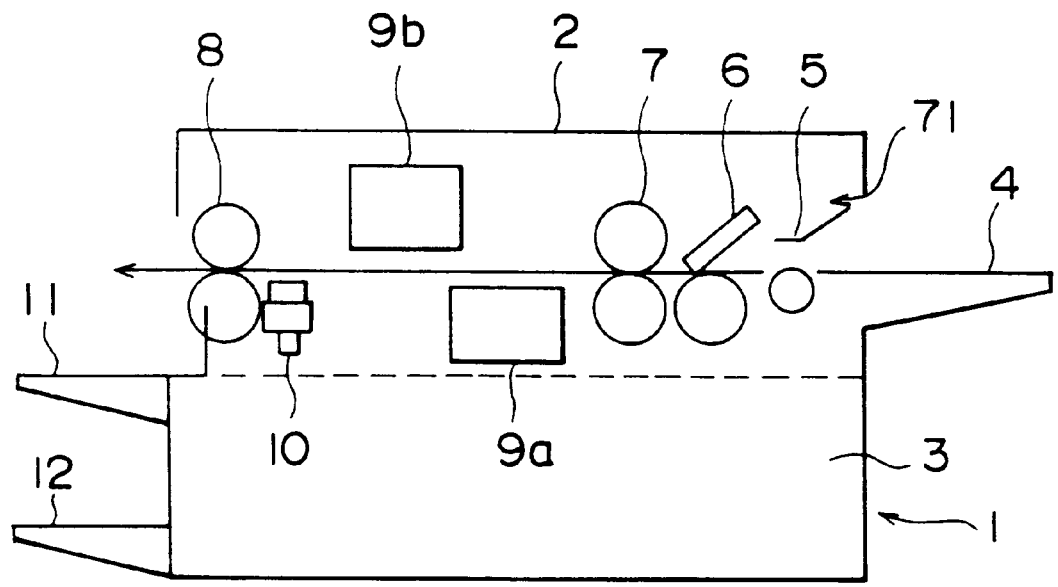
FIG. 19 is an illustration of a structure of a facsimile apparatus having an image forming apparatus according to a third embodiment of the present invention.

A description will now be given of a third embodiment of the present invention. FIG. 19 is an illustration of a structure of a facsimile apparatus having an image forming apparatus according to the third embodiment of the present invention. In FIG. 19, parts that are the same as the parts shown in FIG. 1 and FIG. 4 are given the same reference numerals, and descriptions thereof will be omitted.

Figure 20:
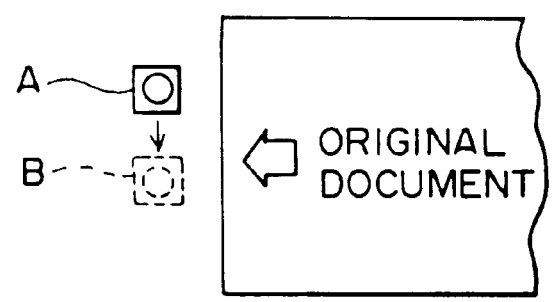
FIG. 20 is an illustration for explaining a position of a marker unit shown in FIG. 19.

In FIG. 19, the first scanner 9a scans the front side of an original document, and the second scanner 9b scans the reverse side of the original document. The marker unit 10 marks the scan completion mark on one side of the original document when a scanning operation for both sides of the original document is completed. That is, in this embodiment, only a single marker unit is provided to provide scan completion mark representing completion of the scanning for both sides of the original document. As shown in FIG. 20, the marker unit 10 is provided on one side of the path of the original document, and moves in a direction parallel to the leading edge of the original document and perpendicular to the conveying direction of the original document. In FIG. 20, the position A is the original position in which the marker unit 10 is normally positioned. The marker unit 10 is movable to the position B as shown in FIG. 20 by means of a moving mechanism.

Figure 21A:
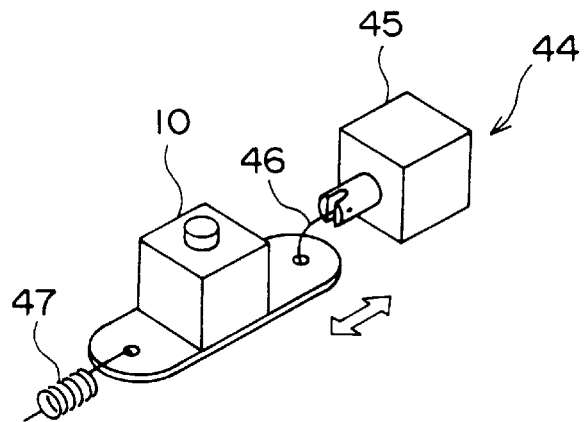
FIGS. 21A, 21B and 21C are perspective views of examples of a moving mechanism for moving the marker unit shown in FIG. 19.

FIG. 21A is a perspective view of an example of the moving mechanism for moving the marker unit 10. A moving mechanism 44 shown in FIG. 21A comprises a solenoid 45 and a spring 47. One side of the marker unit 10 is connected to a shaft of the solenoid 45 by a connecting member 46. The opposite side of the marker unit 10 is connected to the spring 47. The marker unit 10 is normally pulled by the solenoid 45 so that the marker unit 10 is maintained at the position A shown in FIG. 20. When the solenoid is activated, the marker unit 10 is moved to the position B shown in FIG. 20 by a spring force of the spring 47.

Figure 21B:
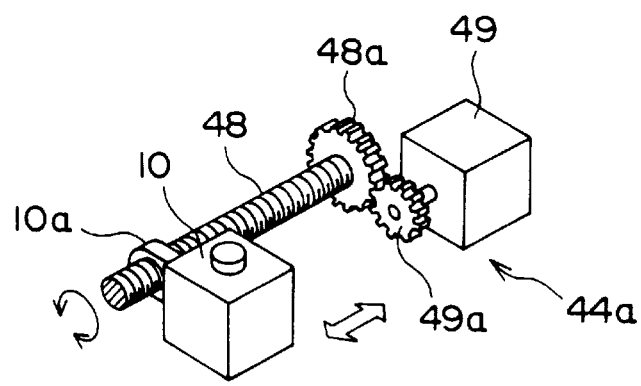

FIG. 21B is a perspective view of another example of the moving mechanism. A moving mechanism 44a shown in FIG. 21B comprises a reversible motor 49 and a screw shaft 48. A shaft of the motor has a gear 49a which engages with a gear 48a mounted on an end of the screw shaft 48. The screw shaft 48 engages with a bearing unit 10a of the marker unit 10. Thus, when the shaft of the motor 49 rotates, the screw shaft is rotated, and the marker unit 10 is moved. If the motor 49 is reversed, the marker unit 10 is moved in the opposite direction.

Figure 21C:
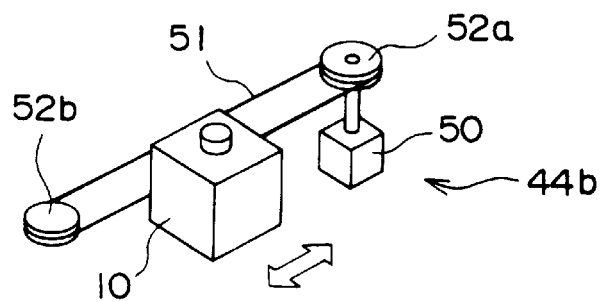

FIG. 21C is a perspective view of another example of the moving mechanism. A moving mechanism 44b shown in FIG. 21B comprises a reversible motor 50, pulleys 52a and 52b and an endless wire 51 provided between the pulleys 52a and 52b.

The direction of movement of the marker unit 10 preferably corresponds to the primary scanning direction of the original document, that is, in a direction perpendicular to the conveying direction of the original document. However, the direction is not limited to the primary scanning direction as long as the marker unit 10 can provide the scan completion mark in a different position on the original document.

Figure 22:
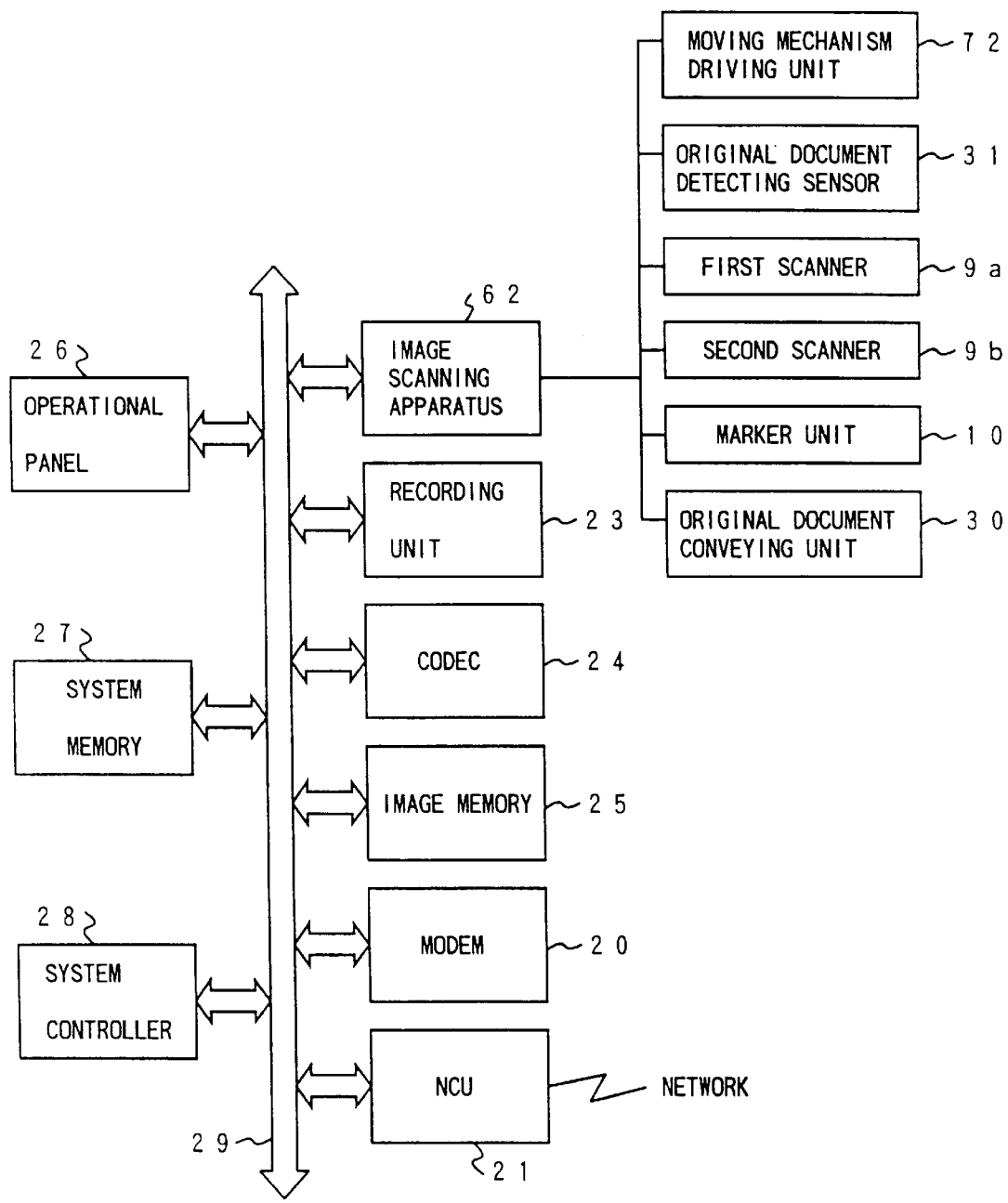
FIG. 22 is a block diagram of the facsimile apparatus shown in FIG. 19.

FIG. 22 is a block diagram of the facsimile apparatus shown in FIG. 19. In FIG. 22, parts that are the same as the parts shown in FIG. 5 are given the same reference numerals, and descriptions thereof will be omitted. The structure of the facsimile apparatus shown in FIG. 19 is the same as the facsimile apparatus shown in FIG. 5 except that an image scanning unit 62 is different from the facsimile apparatus shown in FIG. 5. The image scanning unit 62 comprises a moving mechanism driving unit 72, the original document detecting unit 31, the first scanner 9a, the second scanner 9b, the marker unit 10 and the original document conveying unit 30. The moving mechanism driving unit 72 drives the moving mechanism 44, 44a or 44b to move the marker unit when it is needed.

Figure 23:
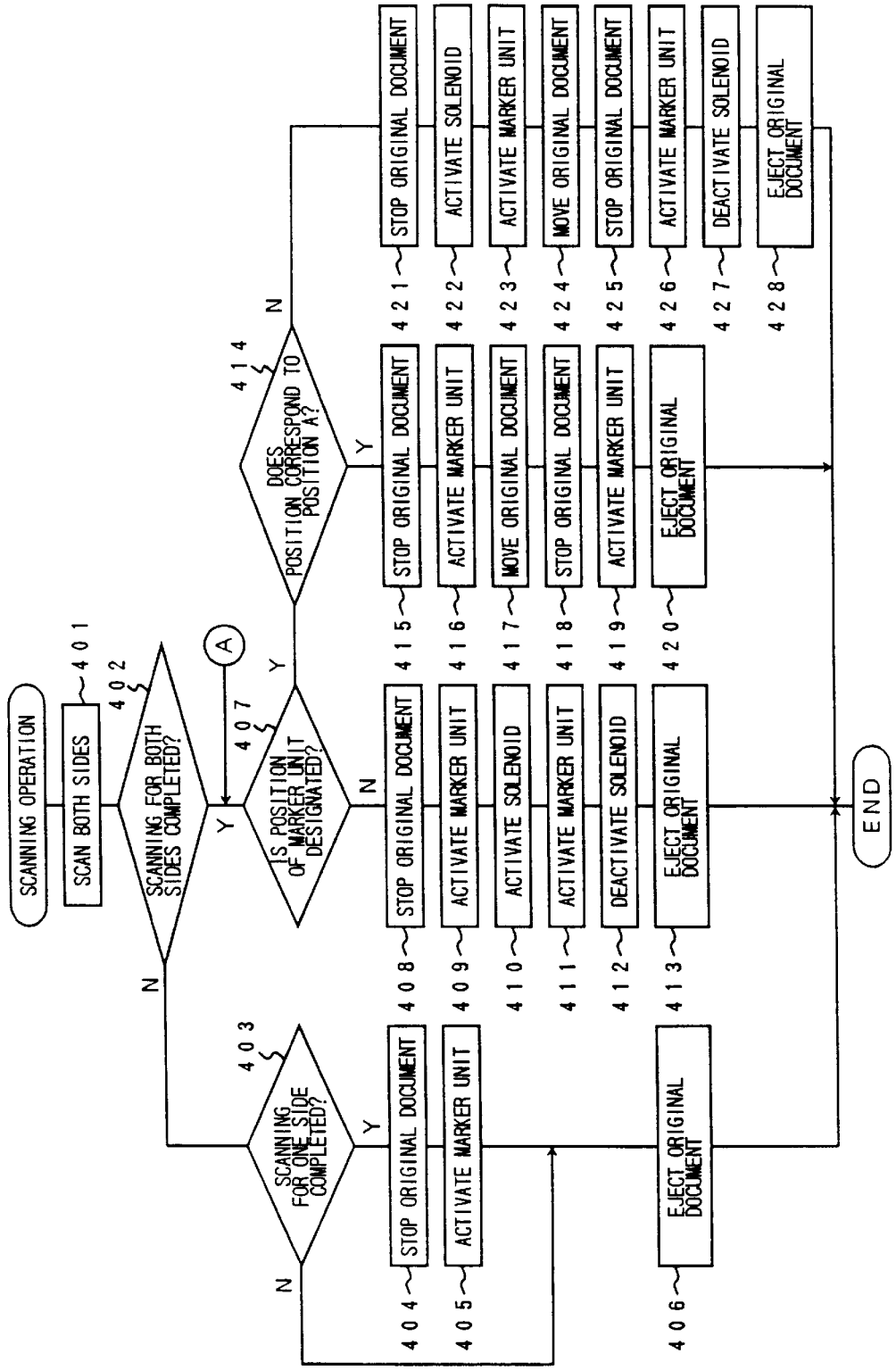
FIG. 23 is a scanning operation performed by the facsimile apparatus shown in FIG. 19.

FIG. 23 is a scanning operation performed by the facsimile apparatus shown in FIG. 19. It is assumed that the driving mechanism 44, which uses the solenoid 45, is used in the facsimile apparatus shown in FIG. 19. When the scanning operation shown in FIG. 23 is started, the scanning operation for both sides of the original document is performed by the first scanner 9a and the second scanner 9b, respectively. When the scanning operation is completed in step 401, the routine proceeds to step 402. In step 402, it is determined whether or not both sides of the original document has been scanned. If it is determined that both sides are not completely scanned, the routine proceeds to step 403. In step 403, it is determined whether or not only one side has been scanned. If it is determined that one side has been scanned, the routine proceeds to step 404 so as to stop the original document. Then, the scan completion mark representing completion of one side of the original document is provided by the marker 10 in step 405. Thereafter, the routine proceeds to step 406 to eject the original document, and then the routine is ended.

Figure 24A:
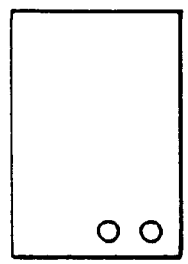
FIGS. 24A, 24B and 24C are illustrations for explaining positions of scan completion marks.

If it is determined, in step 402, that both sides are scanned, the routine proceeds to step 407. In step 407, it is determined whether or not the position of the marker unit 10 is designated. It should be noted that the designation of the position of the marker unit can be performed by the operator through the operational panel 26. If it is determined that the position of the marker unit is not designated, the routine proceeds to step 408 to stop the original document. Then, the scan completion mark is provided by the marker unit 10 in step 409. In step 410, the solenoid 45 is activated so as to move the marker unit 10 to the position B shown in FIG. 20. Then, another scan completion mark is provided by the marker unit 10 in step 411. In step 412, the solenoid is deactivated, and then the original document is ejected in step 413, and the routine is ended. In this case, the scan completion mark provided in step 409 may represent completion of the scanning of the front side, and the scan completion mark provided in step 411 may represent completion of the scanning of the reverse side. FIG. 24A shows the scan completion marks provided by performing steps 409 and 411.

Figure 24B:
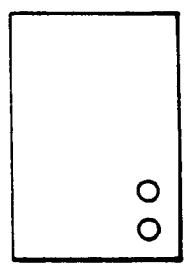

If it is determined, in step 407, that the position of the marker unit 10 is designated, the routine proceeds to step 414. In step 414, it is determined whether or not the designated position of the marker unit 10 corresponds to the normal position A shown in FIG. 20. If it is determined that the designated position corresponds to the normal position A, the routine proceeds to step 415 so as to stop the original document. Then, in step 416, the scan completion mark is provided by the marker unit 10. Thereafter, the original document is moved in step 417 and stopped again in step 418 at a predetermined position. In step 419, another scan completion mark is provided by the marker unit 10, and then the original document is ejected in step 420, and the routine is ended. In this case, the scan completion mark provided in step 416 may represent completion of the scanning of the front side, and the scan completion mark provided in step 419 may represent completion of the scanning of the reverse side. FIG. 24B shows the scan completion marks provided by performing steps 416 and 419.

Figure 24C:
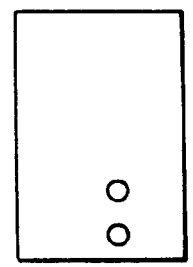

On the other hand, if it is determined, in step 414, that the designated position of the marker unit does not correspond to the normal position A, the routine proceeds to step 421 to stop the original document. Then, in step 422, the solenoid 45 is activated so as to move the marker unit 10 to the position B. Thereafter, in step 423, the scan completion mark is provided by the marker unit 10. Thereafter, the original document is moved in step 424 and stopped again in step 425 at a predetermined position. In step 426, another scan completion mark is provided by the marker unit 10. Thereafter, the solenoid 45 is deactivated, in step 427, so as to return the marker unit to the normal position A, and then the original document is ejected in step 428, and the routine is ended. In this case, the scan completion mark provided in step 423 may represent completion of the scanning of the front side, and the scan completion mark provided in step 426 may represent completion of the scanning of the reverse side. FIG. 24C shows the scan completion marks provided by performing steps 423 and 426.

Figure 25:
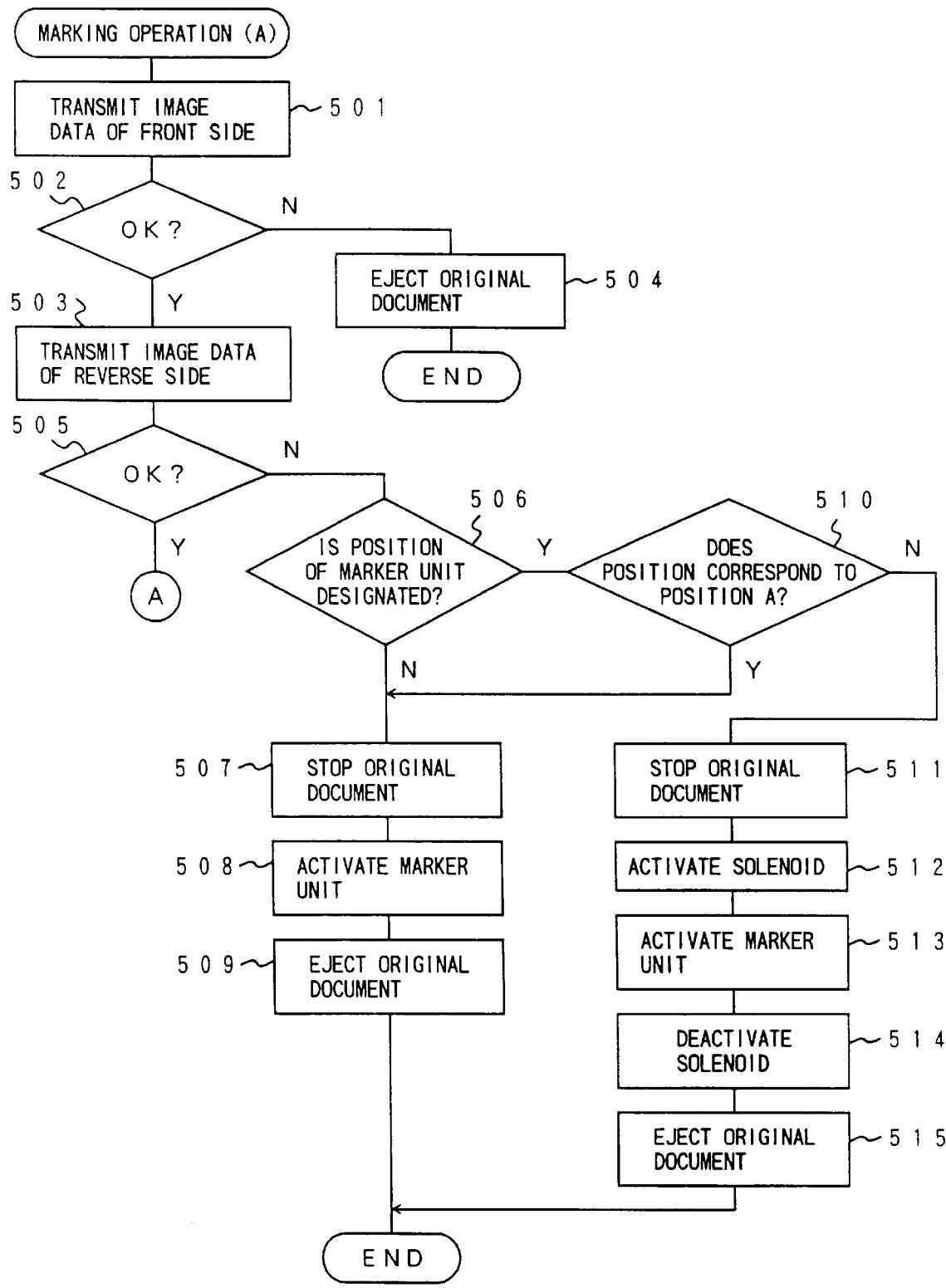
FIG. 25 is a flowchart of a marking operation performed in the facsimile apparatus shown in FIG. 19 for providing a transmission completion mark on an original document.

FIG. 25 is a flowchart of a marking operation (A) performed in the facsimile apparatus shown in FIG. 19 for providing the transmission completion mark on the original document. When the marking operation (A) is started, both sides of the original document are scanner by the first scanner 9a and the second scanner 9b, respectively. The image information data corresponding to the front side is compressed and modulated, and is sent, in step 501, to a remote facsimile apparatus through the network control unit 21. It is then determined, in step 502, whether or not a transmission error has occurred. If it is determined that a transmission error has occurred, the routine proceeds to step 504 to eject the original document, and then the routine is ended. If it is determined that no transmission error has occurred, the routine proceeds to step 503. In step 503, the image information data corresponding to the reverse side of the original document is compressed and modulated, and is transmitted to the remote facsimile apparatus through the network control unit 21. It is determined, in step 505, whether or not a transmission error has occurred. If it is determined that no transmission error has occurred, the routine proceeds to step 407 of the scanning operation shown in FIG. 23.

On the other hand, if it is determined, in step 505, that a transmission error has occurred, the routine proceeds to step 506. In step 506, it is determined whether or not the position of the marker unit 10 is designated. It should be noted that the designation of the position of the marker unit can be performed by the operator through the operational panel 26. If it is determined that the position of the marker unit is not designated, the routine proceeds to step 507 to stop the original document. Then, the scan completion mark is provided by the marker unit 10 in step 508, and then the original document is ejected in step 509, and the routine is ended. In this case, the scan completion mark provided in step 508 represents completion of the transmission of the image information data corresponding to the front side.

If it is determined, in step 506, that the position of the marker unit 10 is designated, the routine proceeds to step 510. In step 510, it is determined whether or not the designated position of the marker unit 10 corresponds to the normal position shown in FIG. 20. If it is determined that the designated position corresponds to the normal position A, the routine proceeds to step 507. If it is determined, in step 510, that the designated position of the marker unit does not correspond to the normal position A, the routine proceeds to step 511 to stop the original document. Then, in step 512, the solenoid 45 is activated so as to move the marker unit 10 to the position B. Thereafter, in step 513, the transmission completion mark is provided by the marker unit 10. Thereafter, the solenoid 45 is deactivated, in step 514, so as to return the marker unit to the normal position A, and then the original document is ejected in step 515, and the routine is ended. In this case, the transmission completion mark provided in step 513 represents completion of the transmission of the front side.

Figure 26A:
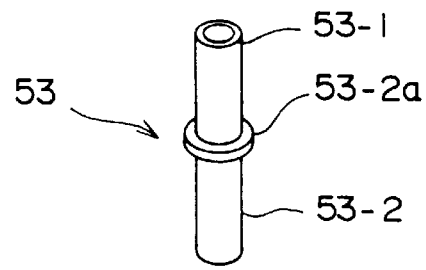
FIGS. 26A to 26D are perspective views of parts of a marker unit used in a fourth embodiment of the present invention.
Figure 26B:
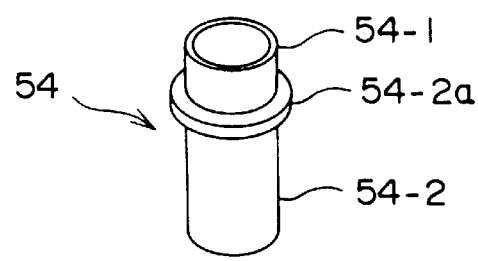
Figure 26C:
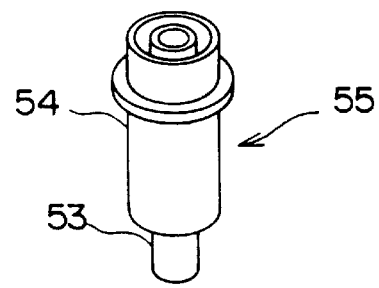
Figure 26D:
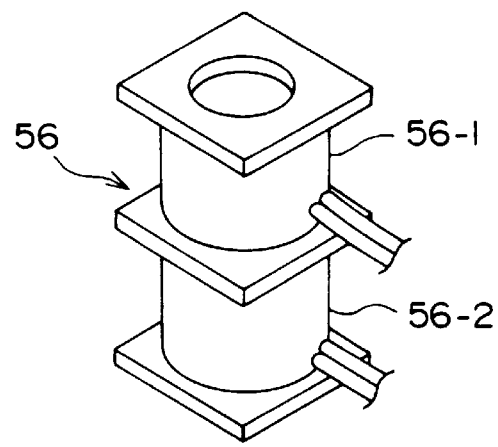
Figure 27:
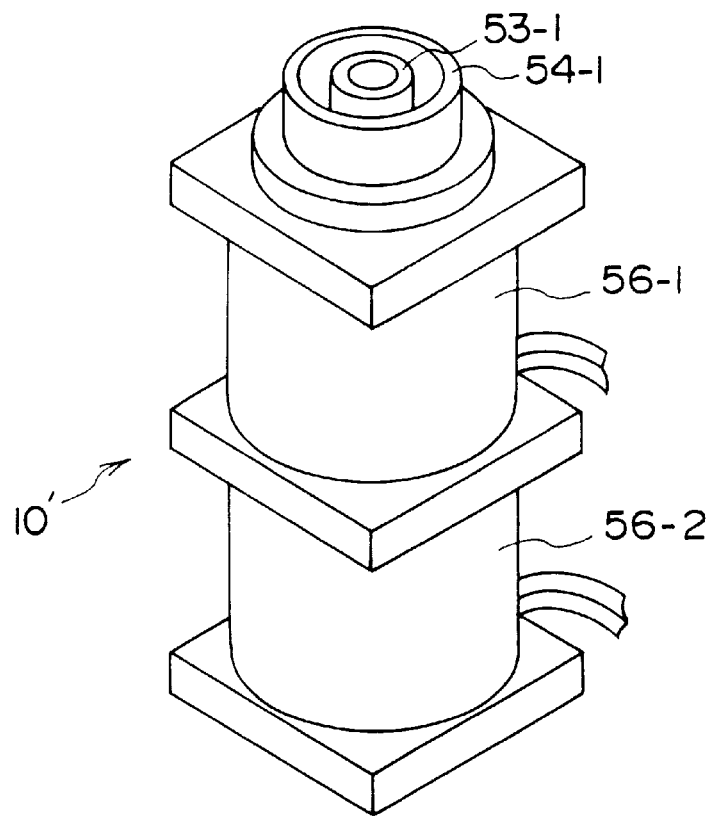
FIG. 27 is a perspective view of the marker unit shown in FIGS. 26A to 26D.

A description will now be given of a fourth embodiment of the present invention. The fourth embodiment is the same as the third embodiment except that the marker unit 10 is replaced by a marker unit 10' shown in FIG. 27. FIGS. 26A through 26D are perspective views of parts of the marker unit 10' used in the fourth embodiment. FIG. 27 is a perspective view of the marker unit 10'.

The marker unit 10' comprises a first stamp 53, a second stamp 54 and an electromagnet body 56. The first stamp 53 comprises, as shown in FIG. 26A, a small circular stamp 53-1 and a magnetic rod 53-2. The small circular stamp 53-1 is joined to the magnetic rod 53-2 with a seat 53-2a therebetween. The second stamp 54 comprises, as shown in FIG. 26B, a large circular stamp 54-1 and a magnetic cylinder 54-2. The large circular stamp 54-1 is joined to the magnetic cylinder 54-2 with a seat 54-2a therebetween. The first stamp 53 is inserted into a hole of the second stamp 54 to form a stamp member 55 as shown in FIG. 26C. The electromagnet body 56 comprises a first electromagnet 56-1 and a second electromagnet 56-2. The first electromagnet 56-1 is mounted on the second electromagnet 56-2 as shown in FIG. 26D. The marker unit 10' shown in FIG. 27 is assembled by inserting the stamp member 55 into a hole formed in the electromagnet body 56. When the second electromagnet 56-2 is activated, the first stamp 53 protrudes from the electromagnet body 56 by a solenoid action. When the first electromagnet 56-1 is activated, the second stamp 54 protrudes from the electromagnet body 56 by a solenoid action. If both of the first electromagnet 56-1 and the second electromagnet 56-2 are activated at the same time, the first stamp 53 and the second stamp 54 protrude at the same time. Thus, a small circle is stamped by the first stamp 53, and a large circle is stamped by the second stamp 54. Additionally, a double circle can be stamped by activating the first electromagnet 56-1 and the second electromagnet 56-2 at the same time. The double circle may be stamped by activating the first electromagnet 56-1 and then the second electromagnet 56-2 after a time interval.

Figure 28:
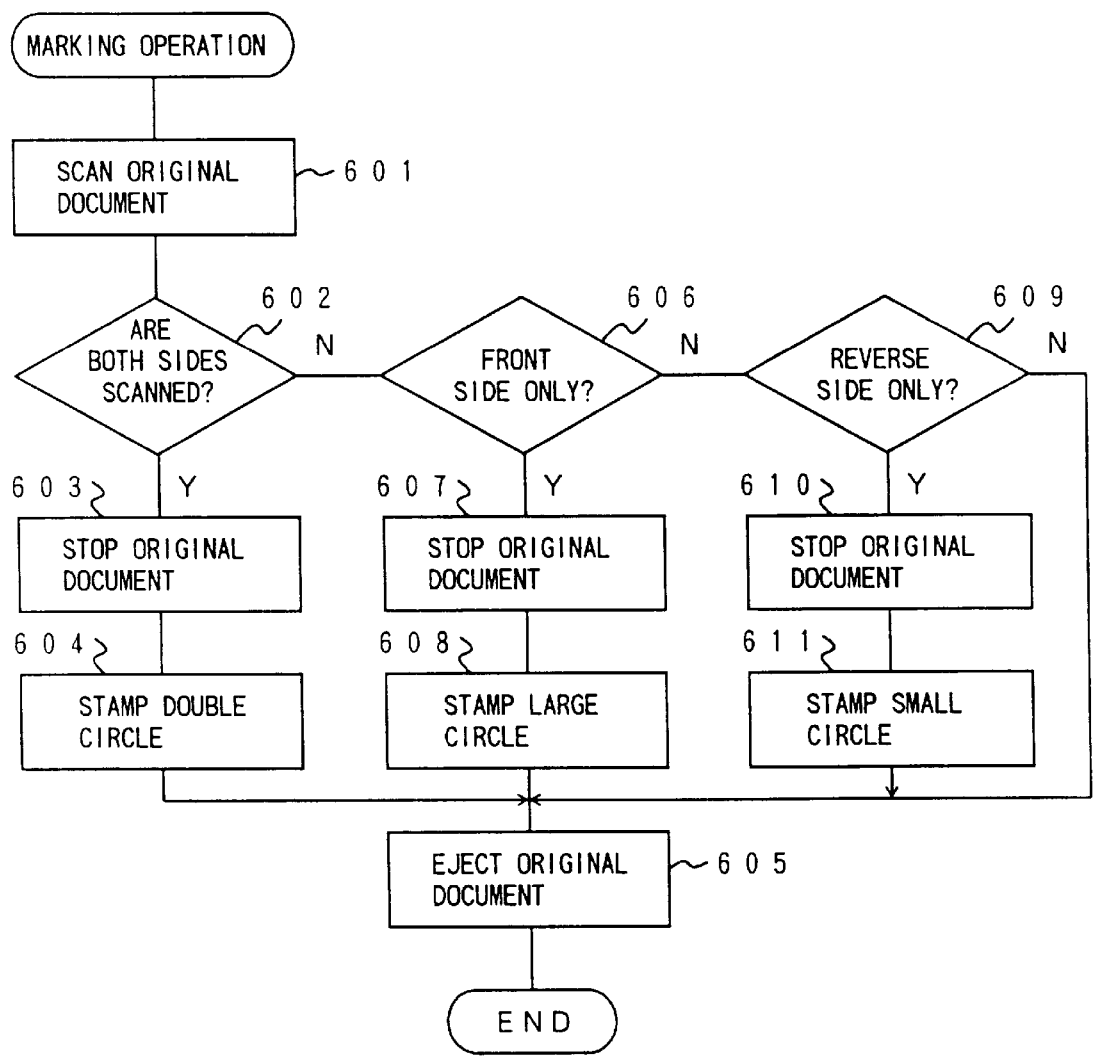
FIG. 28 is a flowchart of a marking operation performed by the facsimile apparatus having the marker unit shown in FIG. 27.
Figure 30A:
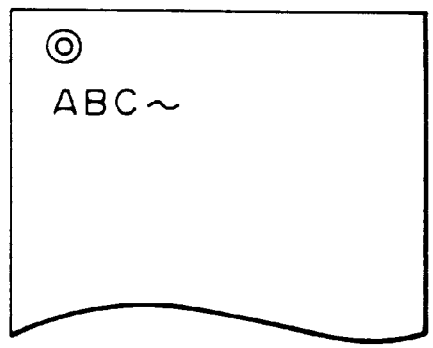
FIGS. 30A, 30B and 30C are illustrations for explaining marks stamped by the marker unit shown in FIG. 27.

FIG. 28 is a flowchart of a marking operation performed by the facsimile apparatus having the marker unit 10' mentioned above. The marking operation shown in FIG. 28 is for indicating completion of the scanning operation of the original document. When the marking operation is started, both sides of the original document are scanned, in step 601, by the scanner 9a and 9b, respectively. It is then determined, in step 602, whether or not both sides have been completely scanned. If it is determined that both sides have been completely scanned, the routine proceeds to step 603 so as to stop the original document. Then, in step 604, the double circle is stamped on the original document by the marker unit 10' as shown in FIG. 30A. The double circle corresponds to the scan completion mark representing completion of the scanning of both sides of the original document. Thereafter, the original document is ejected in step 605, and the routine is ended.

Figure 30B:
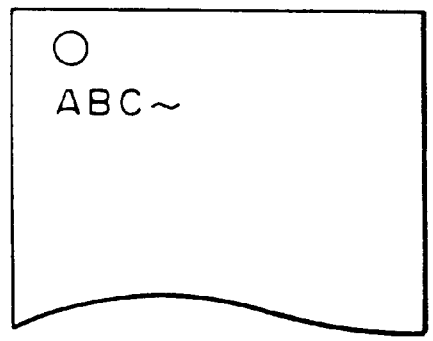

If it is determined that both sides have not been completely scanned, the routine proceeds to step 606. In step 606, it is determined whether or not the front side has been completely scanned. If it is determined that the front side has been completely scanned, the routine proceeds to step 607 so as to stop the original document. Then, in step 608, the large circle is stamped on the original document by the marker unit 10' as shown in FIG. 30B. Thereafter, the original document is ejected in step 605, and then the routine is ended. In this case, the large circle represents completion of scanning of the front side of the original document.

If it is determined, in step 606, that the front side has not been completely scanned, the routine proceeds to step 609.

Figure 30C:
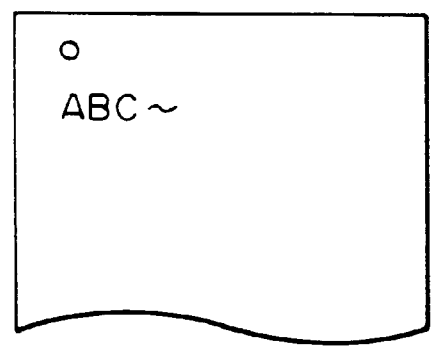

In step 609, it is determined whether or not the reverse side has been completely scanned. If it is determined that the reverse side has been completely scanned, the routine proceeds to step 610 so as to stop the original document. Then, the small circle is stamped on the original document by the marker unit 10' as shown in FIG. 30C. Thereafter, the original document is ejected in step 605, and the routine is ended. In this case, the small circle represents completion of scanning of the reverse side of the original document. If it is determined, in step 609, that the reverse side has not been completely scanned, the routine proceeds to step 605 so as to eject the original document without stamping.

Figure 29:
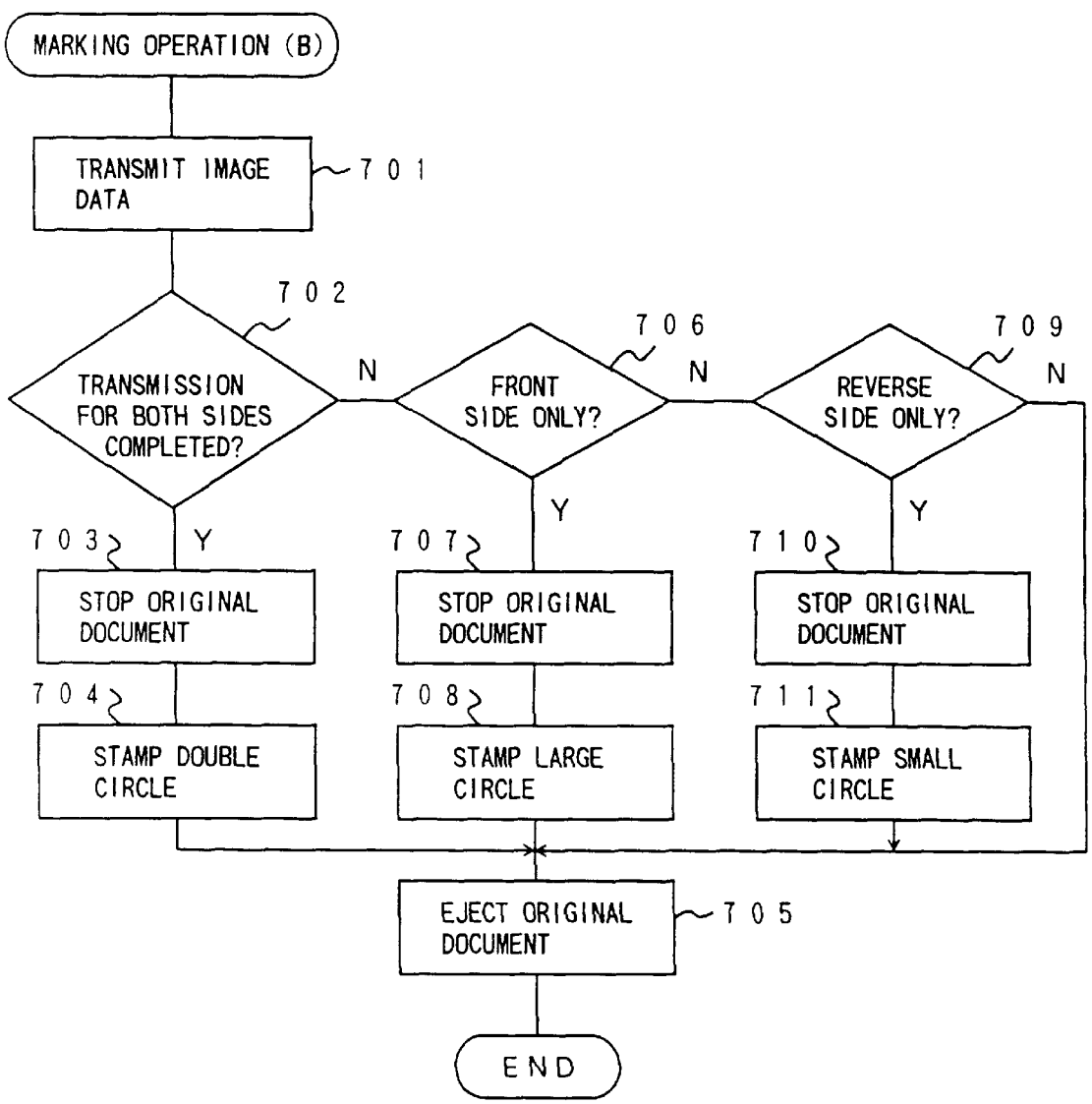
FIG. 29 is a flowchart of a marking operation performed by the facsimile apparatus having the marker unit shown in FIG. 27.

FIG. 29 is a flowchart of a marking operation performed by the facsimile apparatus having the marker unit 10' mentioned above. The marking operation shown in FIG. 28 is for indicating completion of the transmitting operation of image information data obtained by scanning the original document. When the marking operation is started, both sides of the original document are scanned by the scanner 9a and 9b, respectively. Then the image information data obtained by the scanning is compressed and modulated, and is transmitted, in step 701, to a remote facsimile apparatus through the network control unit 21. It is then determined, in step 702, whether or not the image information data corresponding to both sides has been completely transmitted. If it is determined that the image information data corresponding to both sides has been completely transmitted, the routine proceeds to step 703 so as to stop the original document. Then, in step 704, the double circle is stamped on the original document by the marker unit 10' as shown in FIG. 30A. The double circle corresponds to the transmission completion mark representing completion of the transmission of the image information data corresponding to both sides of the original document. Thereafter, the original document is ejected in step 705, and the routine is ended.

If it is determined that the image information data corresponding to both sides has not completely scanned, the routine proceeds to step 706. In step 706, it is determined whether or not the image information data corresponding to the front side has been completely transmitted. If it is determined that the image information data corresponding to the front side has been completely transmitted, the routine proceeds to step 707 so as to stop the original document. Then, in step 708, the large circle is stamped on the original document by the marker unit 10' as shown in FIG. 30B. Thereafter, the original document is ejected in step 705, and then the routine is ended. In this case, the large circle represents completion of the transmission of the image information data corresponding to the front side of the original document.

If it is determined, in step 706, that the image information data corresponding to the front side has not been completely transmitted, the routine proceeds to step 709. In step 709, it is determined whether or not the image information data corresponding to the reverse side has been completely transmitted. If it is determined that the image information data corresponding to the reverse side has been completely transmitted, the routine proceeds to step 710 so as to stop the original document. Then, the small circle is stamped on the original document by the marker unit 10' as shown in FIG. 30C. Thereafter, the original document is ejected in step 705, and the routine is ended. In this case, the small circle represents completion of transmission of the image information data corresponding to the reverse side of the original document. If it is determined, in step 709, that the image information data corresponding to the reverse side has not been completely transmitted, the routine proceeds to step 705 so as to eject the original document without stamping.

Figure 31:
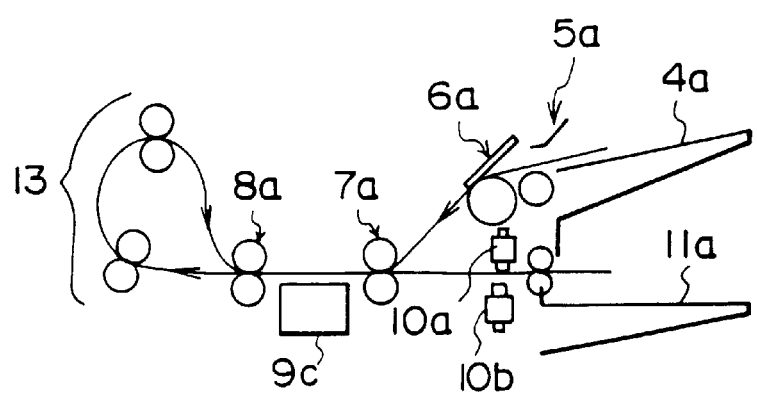
FIG. 31 is an illustration of a variation of the image forming apparatus shown in FIG. 4.
Figure 32:
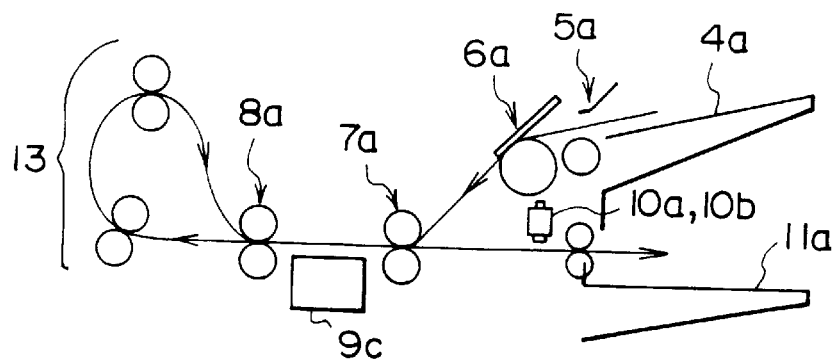
FIG. 32 is an illustration of a variation of the image forming apparatus shown in FIG. 13.
Figure 33:
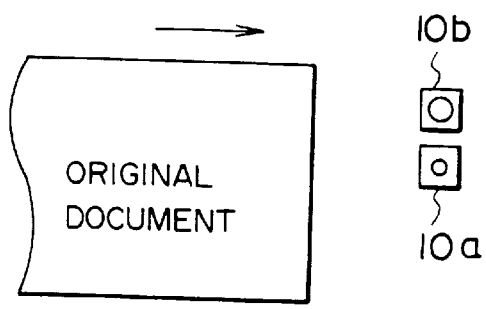
FIG. 33 is an illustration for explaining positions of the marker units shown in FIG. 32.
Figure 34:
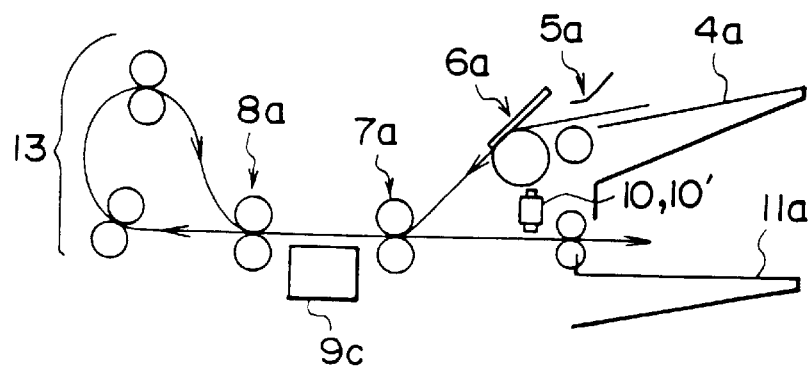
FIG. 34 is an illustration of a variation of the image forming apparatus shown in FIG. 19.

In the above-mentioned first embodiment, the scanner 9a and 9b are separately provided to scan each side of the original document. However, as shown in FIG. 31, only one scanner 9c may be used by turning over the original document by the turn over unit 13. The scanner 9c scans both sides of the original document. Additionally, in the second embodiment, as shown in FIGS. 32 and 33, the scanner 9c may be provided instead of the scanners 9a and 9b by providing the turn over unit 13. Further, in the third and fourth embodiments, as shown in FIG. 34, the scanner 9c may be provided instead of the scanners 9a and 9b by providing the turn over unit 13.

In the above-mentioned embodiments, when the operation is performed for providing the transmission completion mark, the image information data may be temporarily stored in a memory before transmission. In such a case, the completion of transmission may be determined when the image information is completely stored in the memory.

The present invention is not limited to the specifically disclosed embodiments, and variations and modifications may be made without departing from the scope of the present invention.

What is claimed is:

1. An image forming apparatus, comprising:

a scanner configured to scan both sides of an original document during a document scanning operation so as to obtain image information data therefrom;

a marker unit configured to provide a plurality of marks on said original document after scanning said original document; and a controller configured to receive an external signal designating a marking condition and based on said external signal control said marker unit to place said plurality of marks on said original document in accordance with a degree of completion of said scanning operation.

2. The image forming apparatus of claim 1, wherein:

said marker unit comprises two markers;

said original document comprises a front side and a reverse side; and said controller comprises a determination mechanism that determines whether said external signal designates one of said front side and said reverse side as a marking side, said controller controlling said marker unit to mark said marking side in a predetermined marking pattern with at least one of said two markers when said external signal designates said marking side.

3. The image forming apparatus of claim 2, wherein said determination mechanism is configured to control said marker unit to mark said original document in a different arrangement than said predetermined arrangement using both of said two markers.

4. The image forming apparatus of claim 1, wherein:

said marker unit comprises two markers; and said controller comprises a determination mechanism that determines whether one of said two markers is designated by said external signal, and controlling said marker unit to mark said original document with a marker from said two markers designated by said external signal.

5. The image forming apparatus of claim 4, wherein said determination mechanism is configured to cause said marker unit to mark said original document with both markers when said external signal is not present.

6. The image forming apparatus of claim 1, wherein:

said controller comprises a determination mechanism that determines whether a position of said marker unit is designated by said external signal, when said external signal designates said position, said controller controlling said marker unit to move to the position and place a mark on the original document.

7. The image forming apparatus of claim 6, wherein said controller controls said marker unit to move to a predetermined position if said external signal is not present.

8. The image forming apparatus of claim 7, wherein said determination mechanism determines whether a position identified by said external signal is a same position as said predetermined position, and not activating a marker unit moving mechanism causing said if the position identified by said external signal is common with said predetermined position.

9. The image forming apparatus of claim 1, wherein:

said controller comprises a determination mechanism that determines whether a front side and a reverse side of the original document are scanned and controls said marker unit to place respective distinctive groupings of marks on said original document depending on whether only the front side, only the reverse side, or both the front and reverse sides are scanned.

10. An image forming apparatus configured to scan both sides of an original document, comprising:

means for scanning both a front side and a reverse side of the original document in a scanning operation;

means for providing a first mark on the front side of said original document after scanning said front side in said scanning operation; and means for providing a second mark on the reverse side of said original document after scanning said reverse side in said scanning operation.

11. A method for scanning both sides of an original document, comprising the steps of:

scanning both a front side and a reverse side of the original document in a scanning operation;

providing a first mark on the front side of said original document after scanning said front side in said scanning operation; and providing a second mark on the reverse side of said original document after scanning said reverse side in said scanning operation.

12. An image forming apparatus configured to scan both sides of an original document for obtaining image information data therefrom, comprising:

a scanner configured to scan said both sides of the original document in a document scanning operation; and a marker unit providing a mark after completion of scanning of at least one side of the original document, said marker unit providing a plurality of marks in accordance with a condition of completion of scanning both sides of said scanning operation of the original document.

13. The image forming apparatus as claimed in claim 12, further comprising transmission means for transmitting the image information data to a remote apparatus through a communication line after scanning of the original document has been completed, said mark being provided on the original document after a transmitting operation of the image information data is performed so that said mark represents completion of the transmitting operation.

14. An image forming apparatus for scanning both sides of an original document for obtaining image information data, comprising:

a scanner scanning both sides of the original document; and a marker unit providing a mark after a scanning of at least one side of the original document is completed, said marker unit providing a plurality of marks in accordance with a condition of completion of scanning both sides of the original document, wherein said marker unit is configured to make respective shapes of said plurality of marks to be different to each other.

15. The image forming apparatus as claimed in claim 14, further comprising transmission means for transmitting the image information data to a remote apparatus through a communication line after scanning of the original document has been completed, said mark being provided on the original document after a transmitting operation of the image information data is performed so that said mark represents completion of the transmitting operation.

* * * * *